(12) United States Patent
Watanabe et al.

(10) Patent No.: US 12,399,543 B2
(45) Date of Patent: *Aug. 26, 2025

(54) INFORMATION PROCESSING APPARATUS FOR PERFORMING THERMAL CONTROL BASED ON A SPECIFIC COMBINATION OF KEYS BASED ON ACCEPTED OPERATION SIGNAL

(71) Applicant: Lenovo Switzerland International GmbH, Zug (CH)

(72) Inventors: Ryota Watanabe, Kanagawa (JP); Takuroh Kamimura, Kanagawa (JP); Atsunobu Nakamura, Kanagawa (JP); Yuichiro Seto, Kanagawa (JP); Yusaku Morishige, Kanagawa (JP); Ke Ma, Kanagawa (JP)

(73) Assignee: Lenovo Switzerland International GmbH, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,590

(22) Filed: Oct. 31, 2023

(65) Prior Publication Data
US 2024/0061481 A1  Feb. 22, 2024

Related U.S. Application Data

(63) Continuation of application No. 17/183,464, filed on Feb. 24, 2021, now Pat. No. 11,853,136.

(30) Foreign Application Priority Data

Nov. 19, 2020  (JP) ................... 2020-192408

(51) Int. Cl.
*G06F 1/20* (2006.01)
*G05B 19/042* (2006.01)

(52) U.S. Cl.
CPC ........... *G06F 1/206* (2013.01); *G05B 19/042* (2013.01); *G05B 2219/23345* (2013.01)

(58) Field of Classification Search
CPC ....................................... G06F 1/206
See application file for complete search history.

(56) References Cited

U.S. PATENT DOCUMENTS 5,862,351 A * 1/1999 He ................. G06F 9/4403
710/104
6,134,667 A * 10/2000 Suzuki ................ G06F 1/206
361/679.48

(Continued)

FOREIGN PATENT DOCUMENTS

JP  H08328698 A * 12/1996
JP  2001005661 A *  1/2001

*Primary Examiner* — Suresh Suryawanshi
(74) *Attorney, Agent, or Firm* — Osha Bergman Watanabe & Burton LLP

(57) ABSTRACT

An information processing apparatus includes: a controller that outputs notification information based on input information; and a processor that executes system processing based on an operating system (OS) and operation of thermal control processing by control of a Basic Input Output System (BIOS) using the notification information output from the controller. The controller accepts an operation signal indicative of an operated key according to a user's operation on a keyboard; determines whether the operated key is of a specific combination of keys based on the accepted operation signal; upon making a determination that the operated key is of the specific combination of keys, outputs, to the processor, a result of the determination as the notification information; and without another key being pressed after the result of the determination is output from the controller, the processor executes the thermal control processing based on the result of the determination.

9 Claims, 11 Drawing Sheets

(56) References Cited

U.S. PATENT DOCUMENTS

| | | | | |
|---|---|---|---|---|
| 2003/0058215 A1* | 3/2003 | Yamaji | ............... | G06F 3/0489 |
| | | | | 345/156 |
| 2003/0063071 A1* | 4/2003 | Wyatt | ............... | G06F 13/102 |
| | | | | 345/172 |
| 2003/0220721 A1* | 11/2003 | Cohen | ............... | G06F 1/3203 |
| | | | | 700/301 |
| 2005/0289372 A1* | 12/2005 | Park | ............... | G06F 1/3203 |
| | | | | 713/300 |
| 2009/0256546 A1* | 10/2009 | Wu | ............... | G06F 1/08 |
| | | | | 323/318 |
| 2009/0259348 A1* | 10/2009 | Syu | ............... | G06F 1/206 |
| | | | | 700/300 |
| 2009/0278679 A1* | 11/2009 | Dailey | ............... | G06F 9/542 |
| | | | | 340/500 |
| 2014/0298003 A1* | 10/2014 | Ali | ............... | G06F 9/4416 |
| | | | | 713/2 |
| 2020/0133358 A1* | 4/2020 | Mishra | ............... | G06V 10/774 |

\* cited by examiner

INFORMATION PROCESSING APPARATUS FOR PERFORMING THERMAL CONTROL BASED ON A SPECIFIC COMBINATION OF KEYS BASED ON ACCEPTED OPERATION SIGNAL

CROSS-REFERENCE TO RELATED APPLICATIONS

This is a continuation application of U.S. patent application Ser. No. 17/183,464, filed on Feb. 24, 2021, which claims priority to Japanese Patent Application No. 2020-192408, filed on Nov. 19, 2020. The contents of these applications are hereby incorporated herein by reference in their entirety.

TECHNICAL FIELD

The present invention relates to an information processing apparatus and a control method.

BACKGROUND

Information processing apparatuses such as personal computers generate heat according to the operation of electronic devices such as a CPU (Central Processing Unit) and raise the temperature thereof. Among the information processing apparatuses, there is an information processing apparatus configured to perform thermal control in order to suppress the rise in device temperature.

In such an information processing apparatus, a temperature sensor and a cooling fan are provided for thermal control to measure the temperature of a major electronic device so as to control the settings such as the rotational speed of the fan based on the detection result of the temperature sensor (for example, see Japanese Unexamined Patent Application Publication No. 2007-226617). In order to perform the thermal control of the device, settings related to performance such as the upper limit power and the upper limit of the operating frequency of the CPU are also controlled.

For example, in the above-described thermal control, there is an information processing apparatus capable of switching, with a user's operation, between such an operating mode as to give priority to performance, in which the upper limit of CPU power is set as high as possible to maximize the use of a cooling fan in order to suppress a temperature rise, and such an operating mode as to give priority to quietness, in which the upper limit of CPU power is set low to suppress a temperature rise in order to suppress the use of the cooling fan as little as possible. There is also an information processing apparatus which detects a placement state to perform thermal control according to the placement state, because the upper limit of allowable temperature varies depending on the placement state when the information processing apparatus is used, such as being used on a desk or being used on a lap.

However, a driver running on an OS (Operating System) has been conventionally used to detect/determine the user's operation or the placement state in order to perform thermal control. Therefore, the thermal control function may not be able to be applied to such an OS as not to support the function of the driver, so its versatility is low.

SUMMARY

One or more embodiments of the present embodiments provide an information processing apparatus and a control method which enable highly versatile thermal control independent of the type of OS.

According to one or more embodiments, an information processing apparatus according to the first aspect of the present invention includes: a controller which outputs notification information according to input information; and a processor which functions as a system processing unit to execute system processing based on an OS (Operating System), and a BIOS processing unit to execute control related to the performance of the system processing by control of a BIOS (Basic Input Output System) based on the notification information output from the controller.

The above information processing apparatus may be such that the controller includes: an acceptance unit which accepts, as the input information, a detection signal output from a sensor according to the movement of the information processing apparatus; and a determination unit which determines a placement state of the information processing apparatus based on the detection signal accepted by the acceptance unit, and outputs, to the BIOS processing unit, determination result information based on the determination result as the notification information, and the BIOS processing unit executes the control related to the performance of the system processing based on the determination result information output from the controller.

The above information processing apparatus may be such that the BIOS processing unit outputs, to the system processing unit, first setting information for setting an operating mode of the processor preset according to the placement state of the information processing apparatus as the control related to the performance of the system processing, and the system processing unit controls the processor based on the first setting information output from the BIOS processing unit.

The above information processing apparatus may also be configured to further include a heat dissipation unit which replaces air inside a chassis of the information processing apparatus with outside air by the rotation of a fan, wherein the BIOS processing unit outputs, to the controller, second setting information for setting an operating mode related to fan rotation control of the heat dissipation unit preset according to the placement state of the information processing apparatus as the control related to the performance of the system processing, and the controller controls the rotation of the fan of the heat dissipation unit based on the second setting information output from the BIOS processing unit.

The above information processing apparatus may also be such that the controller includes: an acceptance unit which accepts, as the input information, an operation signal indicative of an operated key according to a user's operation on a keyboard; and a determination unit which determines whether the operated key is a specific combination of keys or not based on the operation signal accepted by the acceptance unit, and when determining that the operated key is the specific combination of keys, outputs, to the BIOS processing unit, determination result information based on the determination result as the notification information, and the BIOS processing unit executes the control related to the performance of the system processing based on the determination result information output from the controller.

The above information processing apparatus may further be such that the BIOS processing unit outputs, to the system processing unit, first setting information for setting an operating mode of the processor preset according to the specific combination of keys as the control related to the performance of the system processing, and the system processing unit controls the processor based on the first setting information output from the BIOS processing unit.

The above information processing apparatus may further be configured to further include a heat dissipation unit which replaces air inside a chassis of the information processing apparatus with outside air by the rotation of a fan, wherein the BIOS processing unit outputs, to the controller, second setting information for setting an operating mode related to fan rotation control of the heat dissipation unit preset according to the specific combination of keys as the control related to the performance of the system processing, and the controller controls the rotation of the fan of the heat dissipation unit based on the second setting information output from the BIOS processing unit.

In the above information processing apparatus, the first setting information may include information related to an upper limit of power consumption of the processor.

In the above information processing apparatus, the first setting information may include information related to an upper limit of an operating frequency of the processor.

A control method for an information processing apparatus according to the second aspect of the present invention includes: causing a system processing unit to execute system processing based on an OS (Operating System); causing a controller to output notification information according to input information; and causing a BIOS processing unit to execute control related to the performance of the system processing by control of a BIOS (Basic Input Output System) based on the notification information output from the controller.

The above-described aspects of the present invention enable highly versatile thermal control independent of the type of OS.

DETAILED DESCRIPTION

Embodiments of the present invention will be described in detail below with reference to the accompanying drawings.

First Embodiment

First, an overview of an information processing apparatus according to a first embodiment will be described.

Figure 1:
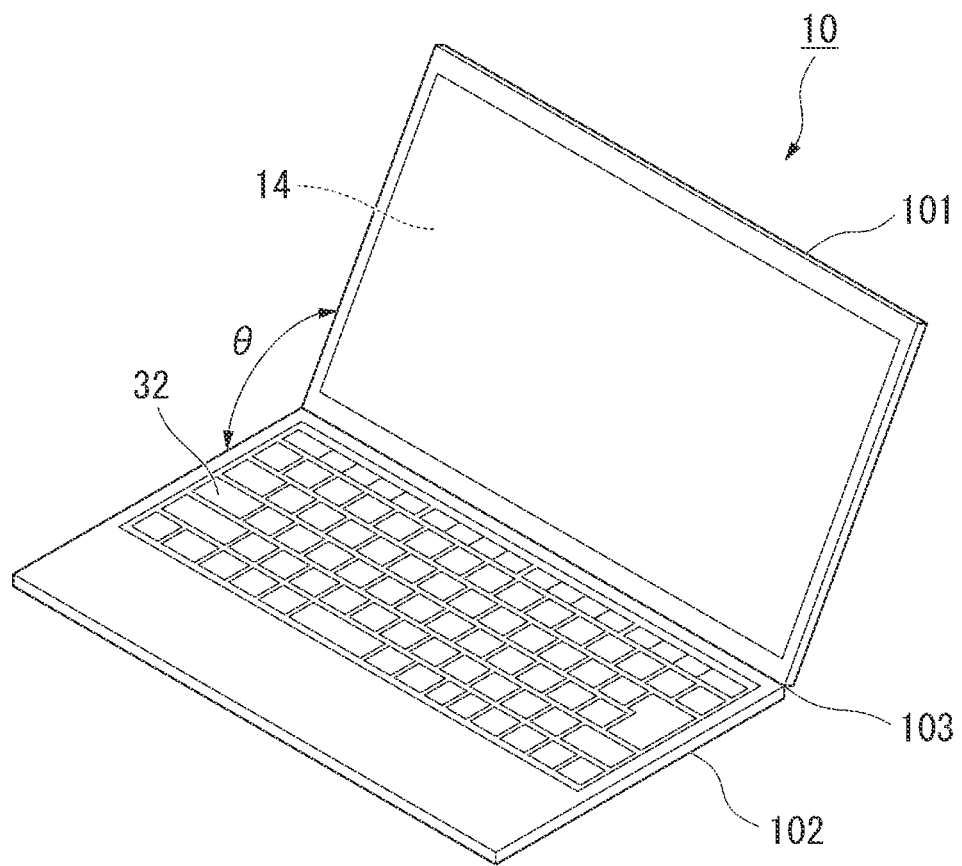
FIG. 1 is a perspective view illustrating the appearance of an information processing apparatus according to a first embodiment.

FIG. 1 is a perspective view illustrating the appearance of an information processing apparatus according to the present embodiment. An illustrated information processing apparatus 10 is a clamshell laptop PC (Personal Computer). The information processing apparatus 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103. A state where an open angle θ between the first chassis 101 and the second chassis 102 around the axis of rotation is substantially 0° is a state where the first chassis 101 and the second chassis 102 are closed in such a manner as to overlap each other (called a "closed state"). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

A display unit 14 is provided on the inner surface of the first chassis 101. Further, an input unit 32 is provided on the inner surface of the second chassis 102. In the illustrated example, the input unit 32 is a physical keyboard. Note that the input unit 32 may include a touch pad or include a software keyboard. In the case of the software keyboard, a display unit is also provided on the inner surface of the second chassis 102.

In the closed state, the display unit 14 is not visible and any operation on the input unit 32 is disabled. On the other hand, in the open state, the display unit 14 is visible and any operation on the keyboard is enabled (that is, the information processing apparatus 10 is available). In a general usage form when a user uses the information processing apparatus 10, the open state often falls within a range of 90°≤open angle θ≤180° as an example.

Figure 2:
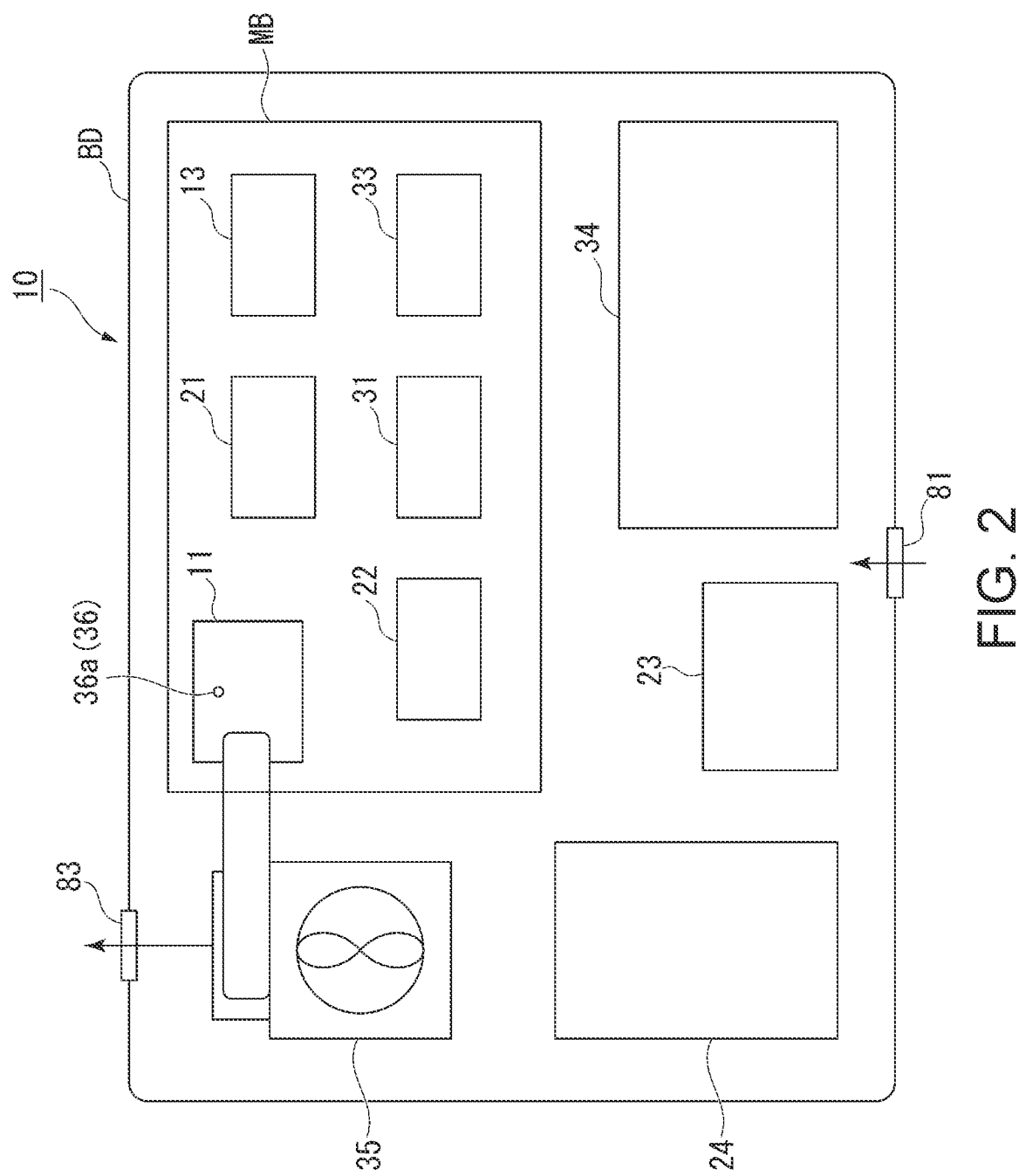
FIG. 2 is a plan view schematically illustrating the inside of a second chassis of the information processing apparatus according to the first embodiment.

FIG. 2 is a plan view schematically illustrating the inside of the second chassis 102 of the information processing apparatus 10. In the following description, the second chassis 102 is also simply called a chassis BD. Here, the description will be made by taking, as an example, the information processing apparatus 10 equipped with a cooling fan 35.

A motherboard MB, a storage medium 23, an audio system 24, a battery 34, and the cooling fan 35 are arranged inside the chassis BD. On the motherboard MB, for example, a CPU (Central Processing Unit) 11, a video subsystem 13, a chipset 21, a BIOS (Basic Input Output System) memory 22, an embedded controller 31, and a power supply circuit 33 are mounted.

The cooling fan 35 (an example of a heat dissipation unit) replaces air inside the chassis BD with outside air. For example, when the cooling fan 35 is operated to rotate the fan (impeller), the outside air enters the inside of the chassis BD through an air inlet 81 of the chassis BD, and the air is heat-exchanged through a heatsink (not illustrated) and exhausted outside of the chassis BD from an air outlet 83. The heatsink is thermally coupled to the CPU 11 through a heat pipe (not illustrated) or the like. Inside the chassis BD, electronic devices required to manage temperature and temperature sensors 36 are arranged at plural predetermined positions, respectively. For example, an illustrated temperature sensor 36a is placed to detect the temperature of the CPU 11. Each of unillustrated other temperature sensors 36 is also placed to detect temperature at each position.

The CPU 11 may be a CPU and a GPU, or either one of them. The CPU 11 may also be such a type as to form the CPU and the GPU on the same core. Further, the CPU 11 may be such a type as to form the CPU and the GPU on different cores and to share the load therebetween. Further, the number of CPUs 11 may be plural.

As an example, the CPU 11 supports any of technologies, such as speed step, speed shift, or throttling, to adjust the operating voltage value and the operating frequency value depending on the operating mode. In the operating mode, the settings of parameters to control the operation of the CPU 11, such as the upper limit of the power consumption of the CPU 11 and the upper limit of the operating frequency of the CPU 11, are included. As the setting of the upper limit of the power consumption of the CPU 11, for example, the setting of PL (Power Limit) defined for Intel CPU may be used. Further, as the setting of the upper limit of the operating frequency of the CPU 11, the setting of TCC (Thermal Control Circuit) defined for Intel CPU may be used. In the following, the parameter to set the upper limit of the power consumption of the CPU 11 is abbreviated as "PL" and the parameter to set the upper limit of the operating frequency of the CPU 11 is abbreviated as "TCC," but these abbreviations are not intended to limit the CPU 11 to an Intel CPU.

For example, the CPU 11 adjusts the operating frequency and operating voltage of the CPU 11 according to the setting of "PL" not to exceed the upper limit of the set power consumption. For example, the CPU 11 instructs the embedded controller 31 to adjust the supply voltage from the power supply circuit 33 to the CPU 11. Further, the CPU 11 sets an upper-limit operating frequency according to the setting of "TCC" to adjust the operating frequency at which the CPU 11 actually operates. Thus, the power consumption and the amount of heat generation of the CPU 11 can be controlled. Note that the parameters to control the operation of the CPU 11 are not limited to the upper limit of the power consumption of the CPU 11 and the upper limit of the operating frequency of the CPU 11, and any other parameter may also be included.

Figure 3:
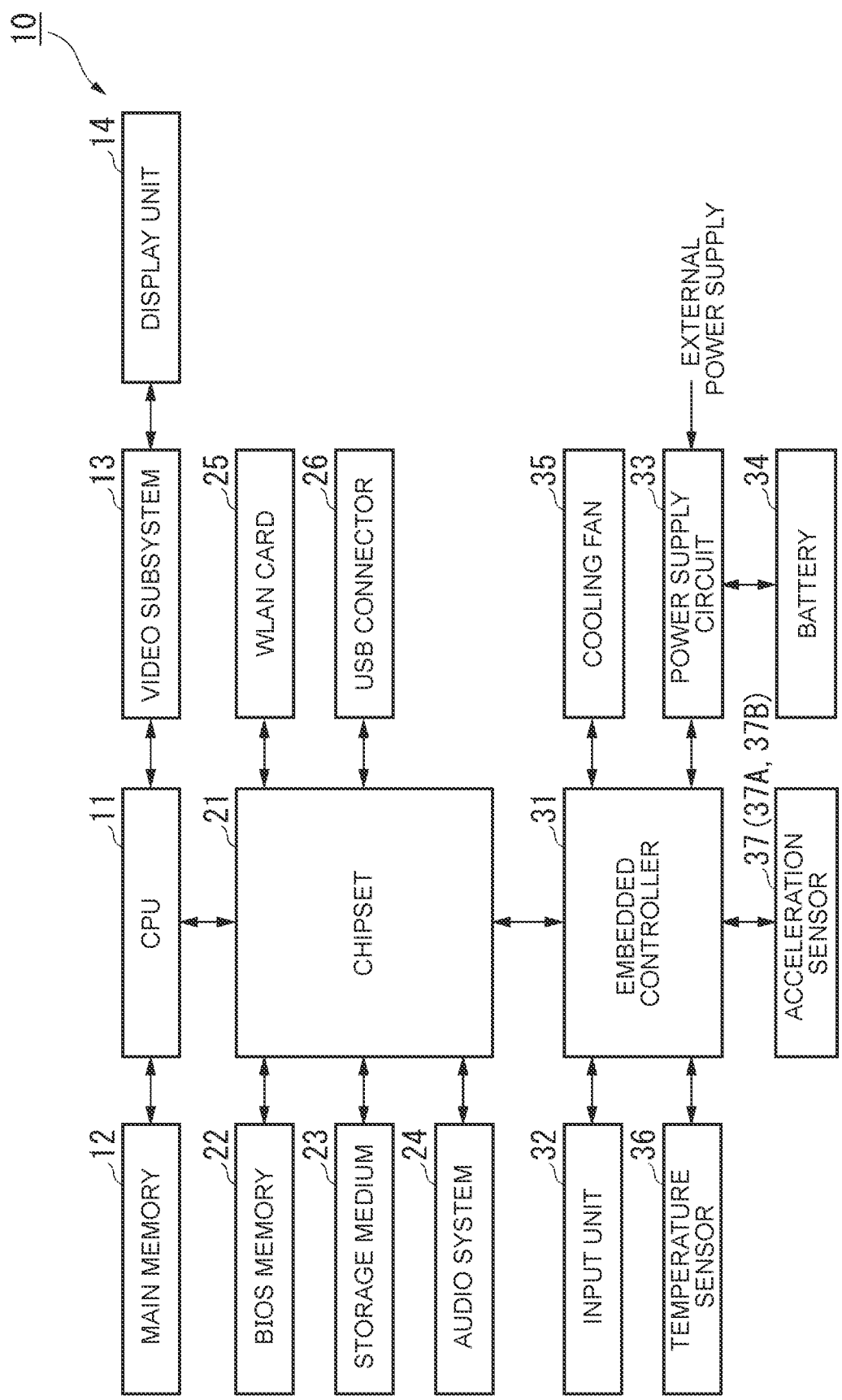
FIG. 3 is a block diagram illustrating an example of the hardware configuration of the information processing apparatus according to the first embodiment.

Referring next to FIG. 3, the main hardware configuration of the information processing apparatus 10 will be described. FIG. 3 is a block diagram illustrating an example of the hardware configuration of the information processing apparatus 10.

The information processing apparatus 10 includes the CPU 11, a main memory 12, the video subsystem 13, the display unit 14, the chipset 21, the BIOS memory 22, the storage medium 23, the audio system 24, a WLAN card 25, a USB connector 26, the embedded controller 31, the input unit 32, the power supply circuit 33, the battery 34, the cooling fan 35, the temperature sensors 36, and an acceleration sensor 37.

The CPU 11 executes various arithmetic processing by program control to control the entire information processing apparatus 10. For example, the CPU 11 executes processing based on an OS (Operating System) or a BIOS program. The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include the OS, various drivers for hardware-operating peripheral devices, various services/utilities, application programs, and the like.

The video subsystem 13 is a subsystem to implement functions related to image display. The video subsystem 13 includes a video controller. This video controller processes a drawing command from the CPU 11, and writes processed drawing information to a video memory and reads this drawing information from the video memory to output the drawing information to the display unit 14 as drawing data (display data).

The display unit 14 is, for example, a liquid crystal display or an organic EL display to display a display screen based on the drawing data (display data) output from the video subsystem 13.

The chipset 21 includes controllers, such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. For example, the plural devices include the BIOS memory 22, the storage medium 23, the audio system 24, the WLAN card 25, the USB connector 26, and the embedded controller 31 to be described below.

The BIOS memory 22 is configured, for example, by an electrically rewritable nonvolatile memory such as an EEPROM (Electrically Erasable Programmable Read Only Memory) or a flash ROM. The BIOS memory 22 stores a BIOS, system firmware used to control the embedded controller 31, and the like.

The storage medium 23 is configured to include an HDD (Hard Disk Drive), an SSD (Solid State Drive), or the like. For example, the storage medium 23 stores the OS, various drivers, various services/utilities, application programs, and various data.

A microphone and a speaker, not illustrated, are connected to the audio system 24, which records, plays back, and outputs sound data. As an example, the microphone and the speaker are incorporated in the information processing apparatus 10.

The WLAN (Wireless Local Area Network) card 25 is connected to a network by a wireless LAN to perform data communication. For example, when receiving data from the network, the WLAN card 25 generates an event trigger indicating that the data is received.

The USB connector 26 is a connector to connect peripheral devices using the USB.

The input unit 32 includes, for example, an input device such as a keyboard and a pointing device such as a touch pad. For example, as illustrated in FIG. 1, the input unit 32 is placed on the inner surface of the second chassis 102 as the keyboard. The input unit 32 outputs, to the embedded controller 31, input information input with a user's operation (for example, an operation signal indicative of a key operated on the keyboard).

The power supply circuit 33 is configured, for example, to include a DC/DC converter, a charge/discharge unit, an AC/DC adapter, and the like. For example, the power supply circuit 33 converts AC voltage supplied from an external power supply through an AC adapter (not illustrated) or DC voltage supplied from the battery 34 into plural voltages required to operate the information processing apparatus 10. Further, the power supply circuit 33 supplies power to each unit of the information processing apparatus 10 under the control of the embedded controller 31.

The battery 34 is, for example, a lithium battery, which is charged through the power supply circuit 33 when power is supplied from the external power supply to the information processing apparatus 10, and outputs the charged power through the power supply circuit 33 as operating power of the information processing apparatus 10 when power is not supplied from the external power supply to the information processing apparatus 10.

The acceleration sensor 37 is, for example, a three-axis acceleration sensor to detect acceleration according to the movement of the information processing apparatus 10. Note that the acceleration sensor 37 is not limited to the three-axis acceleration sensor, and it may be a two-axis acceleration sensor. For example, the acceleration sensor 37 is placed in either one or both of the first chassis 101 and the second chassis 102 illustrated in FIG. 1. The information processing apparatus 10 uses the detection result of the acceleration sensor 37 to determine a placement state of the information processing apparatus 10. The placement state is a state of being placed on a desk, a state or being placed on a lap, or the like. For example, the information processing apparatus 10 uses the detection result of the acceleration sensor 37 to determine the placement state to be the state of being placed on the desk or the state of being placed on the lap based on the posture (orientation) or the amount of shaking of the information processing apparatus 10.

Note that the information processing apparatus 10 may use the detection results of two acceleration sensors 37 (37A, 37B) to detect the open angle θ between the first chassis 101 and the second chassis 102. For example, the information processing apparatus 10 may be so constructed that the acceleration sensor 37A is arranged inside the first chassis 101 and the acceleration sensor 37B is arranged inside the second chassis 102 to detect the open angle θ based on the acceleration detection results according to the respective movements of the first chassis 101 and the second chassis 102.

The embedded controller 31 is a one-chip microcomputer which monitors and controls various devices (peripheral devices, sensors, and the like) regardless of the system state of the information processing apparatus 10. The embedded controller 31 includes a CPU, a ROM, a RAM, multi-channel A/D input terminal and D/A output terminal, a timer, and digital input/output terminals, which are not illustrated. To the digital input/output terminals of the embedded controller 31, for example, the input unit 32, the power supply circuit 33, the cooling fan 35, the temperature sensors 36, the acceleration sensor 37, and the like are connected, and the embedded controller 31 controls the operation of them.

For example, the embedded controller 31 acquires the detection results of the temperature sensors 36 to control the cooling fan 35 based on the detection results. Further, the embedded controller 31 acquires the detection result of the acceleration sensor 37 to determine the placement state of the information processing apparatus 10 based on the detection result. For example, based on the detection result of the acceleration sensor 37, the embedded controller 31 determines whether the information processing apparatus 10 is in the state of being placed on the desk or the state of being placed on the lap. Here, the "state of being placed on the desk" collectively means a state where the information processing apparatus 10 is supported by a stationary object, which is not limited to the state on the desk alone. The same applies to the state on a floor or the state on a shelf. Further, the "state of being placed on the lap" collectively means a state where the information processing apparatus 10 is supported by part of a person's body, which is not limited to the state on the lap alone. The same applies to the state on an arm or the like. For example, the information processing apparatus 10 switches the thermal control to suppress a temperature rise in the information processing apparatus 10 based on the placement state (On Desk/On Lap) determined by the embedded controller 31.

The thermal control is to control the operation of the CPU 11 or the rotation of the cooling fan 35 in order to suppress the temperature rise in the information processing apparatus 10, which is control related to the performance of system processing executed by the CPU 11. Specifically, the thermal control includes control of an operating mode related to the performance of the CPU 11 (hereinafter simply called an "operating mode of the CPU 11"). For example, the operating mode of the CPU 11 includes the setting of "PL," the setting of "TCC," and the like. The information processing apparatus 10 switches the operating mode of the CPU 11 depending on the placement state (On Desk/On Lap) of the information processing apparatus 10.

Further, the thermal control includes, as the control of the cooling fan 35, the control of the start of rotation, the stop of rotation, the rotational speed, and the like. For example, the information processing apparatus 10 controls the rotation of the cooling fan 35 based on the detection results of the temperature sensors 36 provided inside the chassis BD. On this occasion, the control of the rotation of the cooling fan 35 is changed depending on the placement state (On Desk/On Lap) of the information processing apparatus 10.

Figure 4:
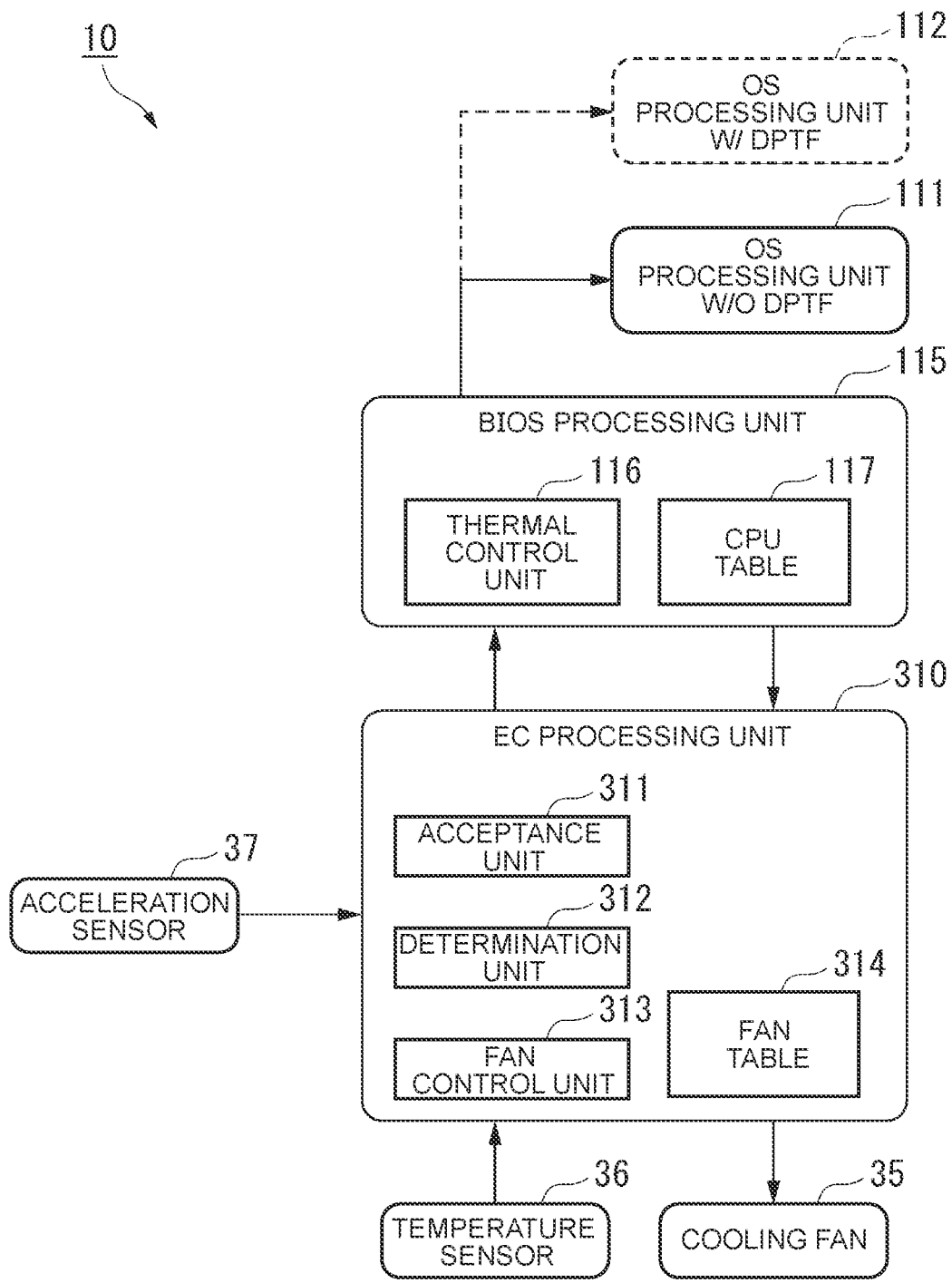
FIG. 4 is a block diagram illustrating an example of the functional configuration of the information processing apparatus according to the first embodiment.

Referring next to FIG. 4, a functional configuration related to the thermal control executed by the information processing apparatus 10 will be described.

FIG. 4 is a block diagram illustrating an example of the functional configuration of the information processing apparatus 10 according to the present embodiment. As the functional configuration related to the thermal control, the information processing apparatus 10 includes an OS processing unit 111 (an example of a system processing unit), a BIOS processing unit 115, and an EC processing unit 310. The OS processing unit 111 is a functional component implemented by the CPU 11 executing the OS and a program (a driver, an application, or the like) running on the OS. The BIOS processing unit 115 is a functional component implemented by the CPU 111 executing the BIOS program. The EC processing unit 310 is a functional component implemented by the embedded controller 31 executing a program to control the embedded controller 31.

The EC processing unit 310 controls the output of notification information according to various kinds of input information and the rotation of the cooling fan 35. For example, the EC processing unit 310 includes an acceptance unit 311, a determination unit 312, a fan control unit 313, and a fan table 314. The acceptance unit 311 accepts, as input information, a detection signal according to the movement of the information processing apparatus 10 output from the acceleration sensor 37. The determination unit 312 determines the placement state (On Desk/On Lap) of the information processing apparatus 10 based on the detection signal accepted by the acceptance unit 311. For example, when the amount of movement of the information processing apparatus 10 is less than a predetermined threshold value, the determination unit 312 determines the state where the information processing apparatus 10 is being placed on the desk. On the other hand, when the amount of movement of the information processing apparatus 10 is equal to or more than the predetermined threshold value, the determination unit 312 determines the state where the information processing apparatus 10 is being placed on the lap. Then, the determination unit 312 outputs determination result information (information indicative of the placement state (On Desk/On Lap)) based on the determination result of the placement state to the BIOS processing unit 115 as the notification information mentioned above. Note that the determination unit 312 may output the determination result information (information indicative of the placement state (On Desk/On Lap)) to the BIOS processing unit 115 as the above-mentioned notification information only when the determination result of the placement state is changed.

The fan control unit 313 controls the rotation of the cooling fan 35. For example, the fan control unit 313 refers to the fan table 314 to control the start and stop of the rotation of the cooling fan 35, the rotational speed of the cooling fan 35, and the like. The fan table 314 is a data table in which fan rotation control setting data used for thermal control is stored. For example, the fan table 314 is stored in a memory inside the embedded controller 31.

Figure 5:
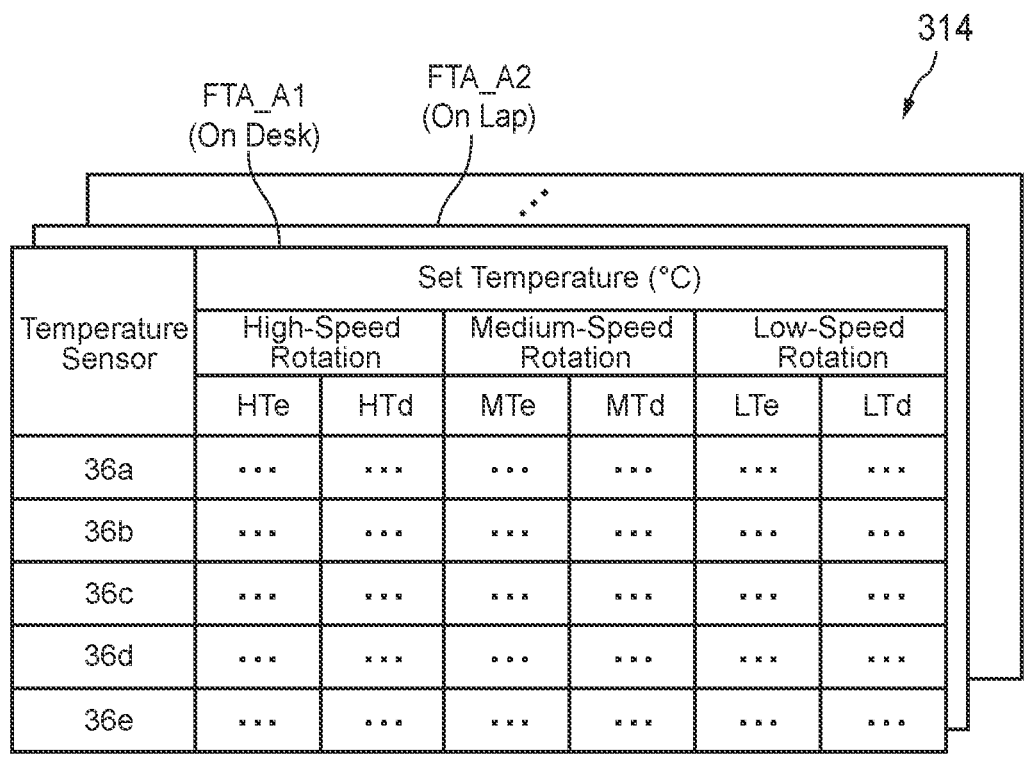
FIG. 5 is a diagram illustrating an example of a fan table according to the first embodiment.

FIG. 5 is a diagram illustrating an example of the fan table 314 according to the present embodiment. In the fan table 314, the temperature sensors 36 are associated with set temperatures used to control the rotation of the cooling fan 35. For example, data on set temperatures changed among four-stage speed steps of the cooling fan 35, i.e., stop of the operating state, low-speed rotation, medium-speed rotation, and high-speed rotation, are stored for each of the temperature sensors 36 (36a to 36e) placed at the plural predetermined positions inside the chassis BD of the information processing apparatus 10. The set temperatures are composed of enabled temperatures LTe, MTe, HTe and disabled temperatures LTd, MTd, HTd for each operating state, and each piece of data is set to form hysteresis characteristics between a case where the rotational speed changes in an increasing direction and a case where the rotational speed changes in a decreasing direction.

The enabled temperatures LTe, MTe, HTe of the low-speed rotation, the medium-speed rotation, and the high-speed rotation are temperatures each of which moves to the speed step concerned from a one-step slower speed step when the measured temperature of each temperature sensor tends to rise. The disabled temperatures LTd, MTd, HTd of the low-speed rotation, the medium-speed rotation, and the high-speed rotation are temperatures each of which moves to a one-step slower speed step from the speed step concerned when the measured temperature of each temperature sensor tends to drop. Here, a speed step slower than the above-mentioned low-speed rotation is a stopped state.

Although the temperature sensors 36a to 36e are illustrated here as examples of plural temperature sensors 36, the number of temperature sensors 36 can be set to any number. The set temperature set for each of the temperature sensors 36a to 36e is set to operate the cooling fan 35 at a rotational speed as low as possible so that the surface temperature in a predetermined place of the chassis BD does not exceed a predetermined value, or to operate the cooling fan 35 at an appropriate rotational speed so that the temperature of each electronic device does not exceed a critical temperature.

For example, the fan control unit 313 starts the rotation of the cooling fan 35 when the measured temperature of any one of the temperature sensors 36a to 36e reaches the enabled temperature LTe, and increases the rotational speed of the cooling fan 35 by one step when the measured temperature reaches the enabled temperature MTe or HTe. Further, the fan control unit 313 decreases the rotational speed of the cooling fan 35 by one step when the measured temperatures of all of the temperature sensors 36a to 36e drop up to less than the disabled temperature MTd or HTd, and stops the rotation of the cooling fan 35 when the measured temperatures become less than the disabled temperature LTd.

Thus, the fan control unit 313 controls the rotation of the cooling fan 35 based on the measured temperatures of the temperature sensors 36 and the fan table 314. However, the fricative sound of air passing through the air outlet 83 becomes larger as the rotational speed of the cooling fan 35 increases. For example, when the temperature of the CPU 11 rises, the rotational speed of the cooling fan 35 increases along therewith. In this case, noise may be generated.

As illustrated in FIG. 5, the fan table 314 includes plural kinds of tables. The plural tables are included in the fan table 314 in a manner to be selectable, such as table FTA_A1 (On Desk) for an on desk mode applied when the information processing apparatus 10 is being placed on a desk and table FTA_A2 (On Lap) for an on lap mode applied when the information processing apparatus 10 is being placed on a lap. For example, since the upper limit of an allowable temperature in the case of use on the lap is lower than that in the case of use on the desk, FTA_A2 (On Lap) is set to operate the cooling fan 35 at a temperature lower than that in FTA_A1 (On Desk) so as to increase the rotational speed according to the temperature rise at a stage earlier than that in FTA_A1 (On Desk). Which of the tables is referred to perform rotation control of the cooling fan 35 is determined by an instruction from the BIOS processing unit 115.

Returning to FIG. 4, the BIOS processing unit 115 includes a thermal control unit 116 and a CPU table 117. The thermal control unit 116 executes control related to the performance of system processing as thermal control based on determination result information (information indicative of either On Desk or On Lap) output from the EC processing unit 310.

For example, the thermal control unit 116 outputs, to the OS processing unit 111, system setting information (an example of first setting information) for setting an operating mode of the CPU 11 preset according to the placement state (On Desk/On Lap) of the information processing apparatus 10 as the control related to the performance of the system processing. Specifically, when the determination result information output from the EC processing unit 310 is information indicative of On Desk, the thermal control unit 116 refers to the CPU table 117 to output, to the OS processing unit 111, system setting information for setting the operating mode of the CPU 11 to the on desk mode. On the other hand, when the determination result information output from the EC processing unit 310 is information indicative of On Lap, the thermal control unit 116 refers to the CPU table 117 to output, to the OS processing unit 111, system setting information for setting the operating mode of the CPU 11 to the on lap mode.

Figure 6:
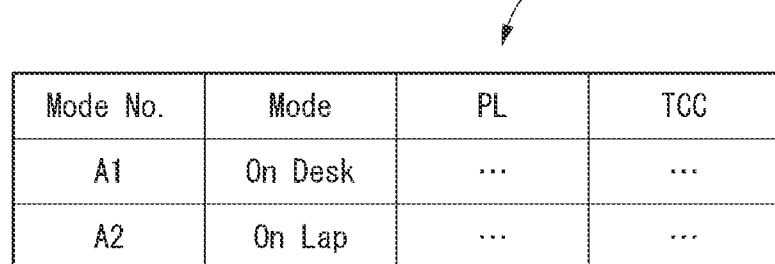
FIG. 6 is a diagram illustrating a CPU table according to the first embodiment.

FIG. 6 is a diagram illustrating an example of the CPU table 117 according to the present embodiment. In the CPU table 117, the settings for each operating mode of the CPU 11 are stored. In the illustrated example, the on desk mode (On Desk) and the on lap mode (ON Lap) are set as operating modes of the CPU 11. In the on desk mode (On Desk), a mode No. "A1" of the on desk mode is associated with the settings of "PL" and "TCC" of the CPU 11 in the on desk mode. In the on lap mode (ON Lap), a mode No. "A2" of the on lap mode is associated with the settings of "PL" and "TCC" of the CPU 11 in the on lap mode. For example, "PL" is so set that the upper-limit value of the power consumption of the CPU 11 is smaller in the on lap mode than that in the on desk mode. Further, "TCC" is so set that the upper-limit value of the operating frequency of the CPU 11 is smaller in the on lap mode than that in the on desk mode. Note that any operating mode other than the on desk mode and the on lap mode may also be set in the CPU table 117.

For example, upon setting the operating mode to the on desk mode, the thermal control unit 116 refers to the CPU table 117 to output, to the OS processing unit 111, the mode No. "A1" and information including the set values of "PL" and "TCC" of the CPU 11 in the on desk mode as system setting information. On the other hand, upon setting the operating mode to the on lap mode, the thermal control unit 116 refers to the CPU table 117 to output, to the OS processing unit 111, the mode No. "A2" and information including the set values of "PL" and "TCC" of the CPU 11 in the on lap mode as system setting information.

Further, the thermal control unit 116 outputs, to the EC processing unit 310, fan setting information (an example of second setting information) for setting the fan table 314 referred to by the EC processing unit 310 to control the rotation of the cooling fan 35 according to the placement state (On Desk/On Lap) of the information processing apparatus 10 as the control related to the performance of the system processing.

Specifically, when the determination result information output from the EC processing unit 310 is information indicative of On Desk, the thermal control unit 116 outputs, to the EC processing unit 310, fan setting information to be set to the table FTA_A1 (On Desk) of the on desk mode applied when the information processing apparatus 10 is being placed on the desk in the fan table 314 illustrated in FIG. 5. The fan control unit 313 of the EC processing unit 310 refers to the table FTA_A1 (On Desk) to control the rotation of the cooling fan 35 based on this fan setting information.

On the other hand, when the determination result information output from the EC processing unit 310 is information indicative of On Lap, the thermal control unit 116 outputs, to the EC processing unit 310, fan setting information to be set to the table FTA_A2 (On Lap) of the on lap mode applied when the information processing apparatus 10 is being placed on the lap in the fan table 314 illustrated in FIG. 5. The fan control unit 313 of the EC processing unit 310 refers to the table FTA_A2 (On Lap) to control the rotation of the cooling fan 35 based on this fan setting information.

Thus, in the information processing apparatus 10, the cooling fan 35 is operated in the on lap mode at a temperature lower than in the on desk mode to increase the rotational speed according to the temperature rise at an earlier stage in order to suppress the temperature rise.

The OS processing unit 111 executes processing by such an OS as not to be equipped with a DPTF (Dynamic Platform and Thermal Framework) driver running on Windows (registered trademark), i.e., processing by any OS other than Windows (registered trademark). Note that the DPTF driver is just an example that supports the on desk mode, the on lap mode, and the like, and the same applies to any other driver (for example, DTT (Dynamic Tuning Technology)) as long as the driver supports these modes. In the following, description will be made by taking the DPTF driver as an example. As the OS other than Windows (registered trademark), Linux (registered trademark) can be exemplified as an example. The OS processing unit 111 controls the operation of the CPU 11 based on the system setting information output from the BIOS processing unit 115. For example, when acquiring system setting information to be set to the on desk mode from the BIOS processing unit 115, the OS processing unit 111 controls the operation of the CPU 11 based on the set values of "PL" and "TCC" of the CPU 11 in the on desk mode included in the system setting information. On the other hand, when acquiring system setting information to be set to the on lap mode from the BIOS processing unit 115, the OS processing unit 111 controls the operation of the CPU 11 based on the set values of "PL" and "TCC" of the CPU 11 in the on lap mode included in the system setting information.

Thus, in the information processing apparatus 10, control is so performed that the upper limit of the power consumption of the CPU 11 and the operating frequency of the CPU 11 are set lower in the on lap mode than in the on desk mode to suppress the temperature rise.

Note that the thermal control of the present embodiment can also be applied to a case of using Windows (registered trademark) as the OS. An OS processing unit 112 (another example of the system processing unit) illustrated in FIG. 4 indicates an example of a functional component to execute processing by Windows (registered trademark) equipped with the DPTF driver. The information processing apparatus 10 may include this OS processing unit 112 instead of or in addition to the OS processing unit 111. Like the OS processing unit 111, the OS processing unit 112 controls the operation of the CPU 11 based on the system setting information output from the BIOS processing unit 115. However, as for the settings of the CPU 11 (PL, TCC, and the like) used to control the operation of the CPU 11, the OS processing unit 112 uses those set by the DPTF driver. For example, the OS processing unit 112 controls the operation of the CPU 11 based on the system setting information output from the BIOS processing unit 115. In the DPTF driver, for example, a thermal control data table including at least the settings (PL, TCC, and the like) of the CPU 11 for the on desk mode and the settings (PL, TCC, and the like) of the CPU 11 for the on lap mode is stored. For example, when acquiring system setting information to be set to the on desk mode from the BIOS processing unit 115, the OS processing unit 112 uses the DPTF driver to refer to the thermal control data table corresponding to the mode No. "A1" indicative of the on desk mode included in the system setting information in order to control the operation of the CPU 11. On the other hand, when acquiring system setting information to be set to the on lap mode from the BIOS processing unit 115, the OS processing unit 112 uses the DPTF driver to refer to the thermal control data table corresponding to the mode No. "A2" indicative of the on lap mode included in the system setting information in order to control the operation of the CPU 11.

Figure 7:
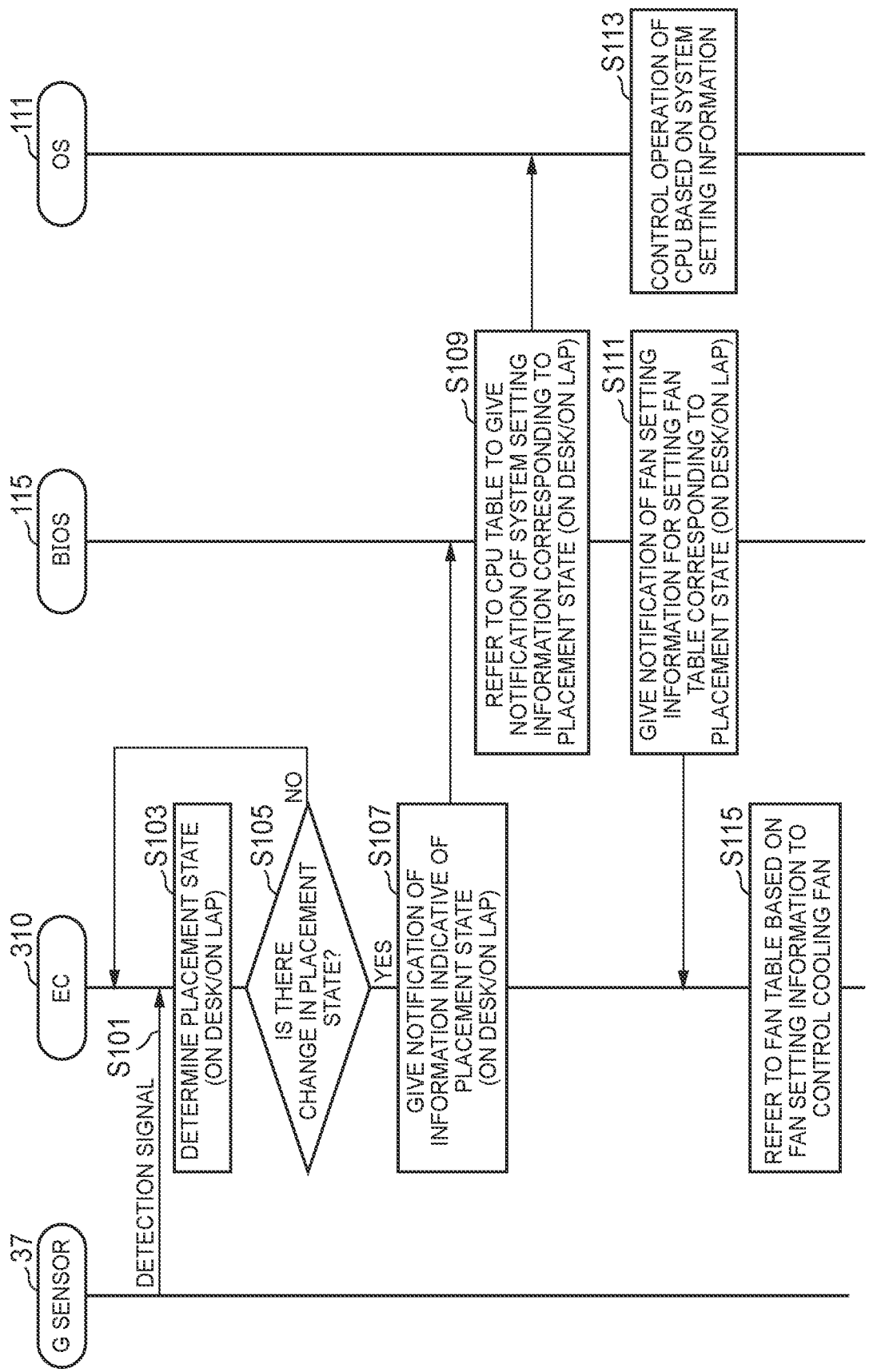
FIG. 7 is a flowchart illustrating an example of thermal control processing according to the first embodiment.

Referring next to FIG. 7, the operation of thermal control processing executed by respective components of the information processing apparatus 10 will be described. FIG. 7 is a flowchart illustrating an example of thermal control processing according to the present embodiment.

(Step S101) When acquiring a detection signal according to the movement of the information processing apparatus 10 output from the acceleration sensor 37 (G sensor), the EC processing unit 310 proceeds to processing in step S103.

(Step S103) Based on the detection signal acquired in step S101 from the acceleration sensor 37, the EC processing unit 310 determines the placement state (On Desk/On Lap) of the information processing apparatus 10. Then, the EC processing unit 310 proceeds to processing in step S105.

(Step S105) Based on the determination result of the placement state in step S103, the EC processing unit 310 determines whether there is a change in placement state or not. When determining that there is no change in placement state (NO), the EC processing unit 310 returns to the processing in step S101 to acquire a detection signal output from the acceleration sensor 37 (G sensor). On the other hand, when determining that there is a change in placement state (YES), the EC processing unit 310 proceeds to processing in step S107.

(Step S107) Based on the determination result of the placement state, the EC processing unit 310 notifies the BIOS processing unit 115 of determination result information indicative of the placement state (On Desk/On Lap). For example, when determining that the placement state is a state where the information processing apparatus 10 is being placed on the desk, the EC processing unit 310 outputs, to the BIOS processing unit 115, determination result information indicating that the placement state is On Desk, while when determining that the placement state is a state where the information processing apparatus 10 is being placed on the lap, the EC processing unit 310 outputs, to the BIOS processing unit 115, determination result information indicating that the placement state is On Lap. Then, the procedure proceeds to processing in step S109.

(Step S109) When acquiring in step S107 the determination result information output from the EC processing unit 310, the BIOS processing unit 115 refers to the CPU table 117 illustrated in FIG. 6 based on this determination result information to notify the OS processing unit 111 of system setting information to be set to an operating mode corresponding to the placement state (On Desk/On Lap). For example, when the determination result information output from the EC processing unit 310 is information indicative of On Desk, the BIOS processing unit 115 refers to the CPU table 117 to output, to the OS processing unit 111, system setting information for setting the operating mode of the CPU 111 to the on desk mode. On the other hand, when the determination result information output from the EC processing unit 310 is information indicative of On Lap, the BIOS processing unit 115 refers to the CPU table 117 to output, to the OS processing unit 111, system setting information for setting the operating mode of the CPU 111 to the on lap mode. Then, the BIOS processing unit 115 proceeds to processing in step S111.

(Step S111) When acquiring in step S107 the determination result information output from the EC processing unit 310, the BIOS processing unit 115 notifies the EC processing unit 310 of fan setting information for setting the fan table 314, to be referred to by the EC processing unit 310 to control the rotation of the cooling fan 35 based on this determination result information, to a table corresponding to the placement state (On Desk/On Lap). For example, when the determination result information output from the EC processing unit 310 is information indicative of On Desk, the BIOS processing unit 115 outputs, to the EC processing unit 310, fan setting information to be set to the table FTA_A1 (On Desk) of the on desk mode in the fan table 314 illustrated in FIG. 5. On the other hand, when the determination result information output from the EC processing unit 310 is information indicative of On Lap, the BIOS processing unit 115 outputs, to the EC processing unit 310, fan setting information to be set to the table FTA_A2 of the on lap mode in the fan table 314 illustrated in FIG. 5.

Note that the order of step S109 and step S111 may be changed, or these steps may be performed at the same time.

(Step S113) When acquiring in step S109 the system setting information output from the BIOS processing unit 115, the OS processing unit 111 controls the operation of the CPU 11 based on this system setting information. For example, when acquiring system setting information to be set to the on desk mode from the BIOS processing unit 115, the OS processing unit 111 controls the operation of the CPU 11 based on the set values of "PL" and "TCC" of the CPU 11 in the on desk mode included in the system setting information. On the other hand, when acquiring system setting information to be set to the on lap mode from the BIOS processing unit 115, the OS processing unit 111 controls the operation of the CPU 11 based on the set values of "PL" and "TCC" of the CPU 11 in the on lap mode included in the system setting information.

Note that when the OS of the information processing apparatus 10 is Windows (registered trademark) equipped with the DPTF driver, the OS processing unit 112 controls the operation of the CPU 11 in step S113 based on the system setting information output from the BIOS processing unit 115. For example, when acquiring system setting information to be set to the on desk mode from the BIOS processing unit 115, the OS processing unit 112 controls the operation of the CPU 11 based on the settings (PL, TCC, and the like) of the CPU 11 for the on desk mode set by the DPTF driver. On the other hand, when acquiring system setting information to be set to the on lap mode from the BIOS processing unit 115, the OS processing unit 112 controls the operation of the CPU 11 based on the settings (PL, TCC, and the like) of the CPU 11 for the on lap mode set by the DPTF driver.

(Step S115) When acquiring in step S111 fan setting information output from the BIOS processing unit 115, the EC processing unit 310 refers to a table based on the fan setting information in the fan table 314 to control the cooling fan 35. For example, when acquiring fan setting information to be set to the table FTA_A1 (On Desk) of the on desk mode, the EC processing unit 310 refers to the table FTA_A1 (On Desk) to control the rotation of the cooling fan 35. On the other hand, when acquiring fan setting information to be set to the table FTA_A2 (On Lap) of the on lap mode, the EC processing unit 310 refers to the table FTA_A2 (On Lap) to control the rotation of the cooling fan 35.

Figure 8A:
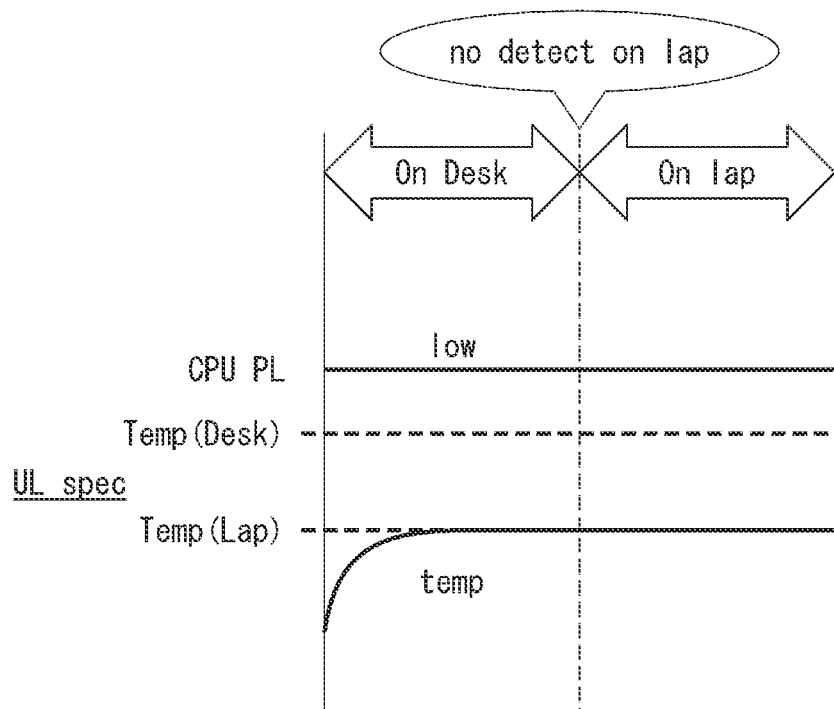
FIGS. 8A and 8B are explanatory diagrams of the effect of thermal control according to the first embodiment.
Figure 8B:
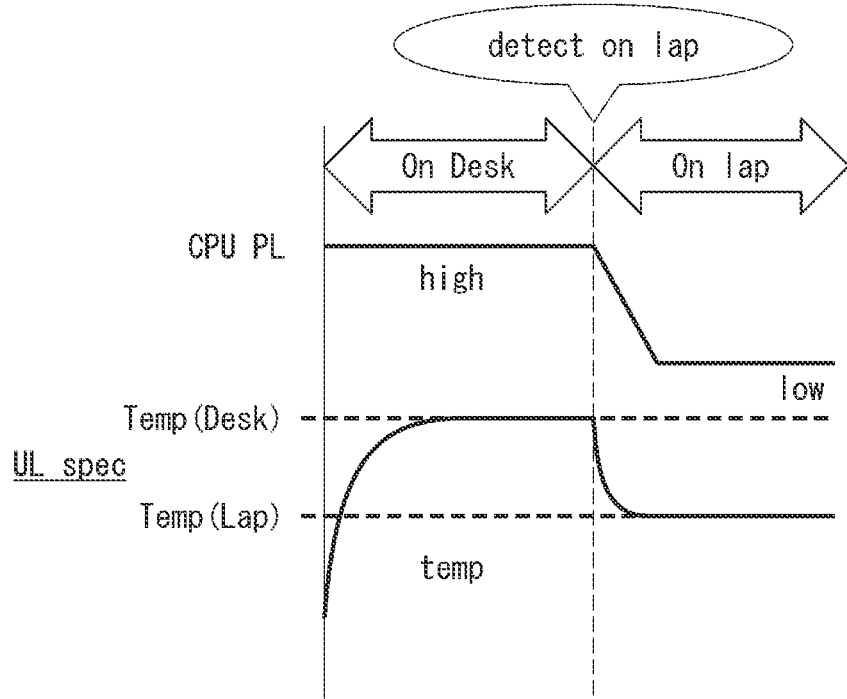

FIGS. 8A and 8B are explanatory diagrams of the effect of thermal control according to the present embodiment. FIG. 8A illustrates the setting of the upper limit (PL) of the power consumption of the CPU 11 and the temperature (Temp) of the information processing apparatus 10 when the thermal control is not switched between On Desk and On Lap. In the UL safety standards, temperature (Temp(Lap))

allowed in a case where the placement state in use is on the lap (that is, in contact with a person) is defined as temperature lower than temperature (Temp(Desk)) allowed in a case where the placement state in use is on the desk (that is, not in contact with a person). When the thermal control is not switched between on the desk and on the lap, since the temperature needs to be set not to exceed the temperature (Temp(Lap)) allowed in the case of being on the lap (in the case of being in contact with a person) in both cases of being on the desk and on the lap, the upper limit (PL) of the power consumption of the CPU 11 is fixed to the low setting in the on lap mode.

On the other hand, FIG. 8B illustrates the setting of the upper limit (PL) of the power consumption of the CPU 11 and the temperature (Temp) of the information processing apparatus 10 when the thermal control is switched between On Desk and On Lap. In this case, since allowable temperature in the on desk mode is higher than that in the on lap mode, the upper limit (PL) of the power consumption of the CPU 11 in the on desk mode can be set higher than that in the on lap mode. Thus, since the information processing apparatus 10 can increase the performance of the CPU 11 when being used on the desk by switching the thermal control between on the desk and on the lap while complying with the UL safety standards in both cases of being used on the lap and on the desk, user convenience is improved.

As described above, the information processing apparatus 10 according to the present embodiment includes the embedded controller 31 (an example of a controller) which outputs notification information according to input information. The information processing apparatus 10 also includes the OS processing unit 111 or the OS processing unit 112 (the example of the system processing unit) which executes system processing based on the OS, and the CPU 11 (an example of a processor) functioning as the BIOS processing unit 115 which executes, by BIOS control, control related to the performance of the OS processing unit 111 or the OS processing unit 112 based on notification information output from the embedded controller 31.

Thus, the information processing apparatus 10 enables highly versatile thermal control independent of the type of OS by the BIOS performing control related to performance based on the notification from the embedded controller 31.

For example, the embedded controller 31 (EC processing unit 310) accepts, as the input information, a detection signal according to the movement of the information processing apparatus 10 from the acceleration sensor 37 which outputs the detection signal, and determines the placement state of the information processing apparatus 10 (for example, whether the information processing apparatus 10 is being placed on the desk or on the lap) based on the accepted detection signal. Then, the EC processing unit 310 outputs determination result information based on the determination result to the CPU 11 (BIOS processing unit 115) as the notification information. Based on the determination result information output from the EC processing unit 310, the BIOS processing unit 115 executes control related to the performance of the system processing.

Thus, since the embedded controller 31 determines the placement state of the information processing apparatus 10 based on the detection signal of the acceleration sensor 37, and the BIOS performs control related to performance based on the determination result, the information processing apparatus 10 enables highly versatile thermal control independent of the type of OS.

Specifically, the BIOS processing unit 115 outputs, to the OS processing unit 111 or the OS processing unit 112, system setting information (the example of the first setting information) for setting an operating mode (on desk mode/on lap mode) of the CPU 11 preset according to the placement state (On Desk/On Lap) of the information processing apparatus 10 as the control related to the performance of the system processing. Based on the system setting information (on desk mode/on lap mode) output from the BIOS processing unit 115, the OS processing unit 111 or the OS processing unit 112 controls the upper limit of the power consumption or the upper limit of the operating frequency of the CPU 11.

Thus, since the information processing apparatus 10 controls the upper limit of the power consumption or the upper limit of the operating frequency of the CPU 11 according to the placement state (On Desk/On Lap) of the information processing apparatus 10, the performance of the CPU 11 can be improved when being used on the desk while complying with the UL safety standards in both cases of being used on the lap and being used on the desk, thereby improving user convenience.

The information processing apparatus 10 further includes the cooling fan 35 (the example of the heat dissipation unit) which replaces air inside the chassis of the information processing apparatus 10 with outside air by the rotation of the fan. The BIOS processing unit 115 outputs, to the EC processing unit 310, fan setting information (the example of the second setting information) for setting an operating mode (on desk mode/on lap mode) related to control of the rotation of the cooling fan 35 preset according to the placement state (On Desk/On Lap) of the information processing apparatus 10 as the control related to the performance of the system processing. Based on the fan setting information (on desk mode/on lap mode) output from the BIOS processing unit 115, the EC processing unit 310 controls the rotation of the cooling fan 35.

Thus, since the information processing apparatus 10 controls the rotation of the cooling fan 35 according to the placement state (On Desk/On Lap) of the information processing apparatus 10, the performance of the CPU 11 can be improved when being used on the desk while complying the UL safety standards in both cases of being used on the lap or being used on the desk, thereby improving user convenience.

In the present embodiment, the example of determining the state of being placed on the desk or the state of being placed on the lap as the placement state of the information processing apparatus 10 is described, but the definition of the placement state is not limited to these states. For example, a state where the information processing apparatus 10 is in contact with a person or a state where the information processing apparatus 10 is not in contact with a person may also be defined as the placement state. In this case, the state of being in contact with a person corresponds to the state of being placed on the lap, and the state of not being in contact with a person corresponds to the state of being placed on the desk. Further, for example, a vibrational state in which there is vibration in the information processing apparatus 10 or a stationary state in which there is no vibration in the information processing apparatus 10 may be defined as the placement state. In this case, the vibrational state corresponds to the state of being placed on the lap, and the stationary state corresponds to the state of being placed on the desk. Thus, the placement state can be defined by various criteria based on the detection signal output from the acceleration sensor 37.

Further, in the present embodiment, the example of using the acceleration sensor 37 to determine the placement state of the information processing apparatus 10 is described, but a gyro sensor, an inclination sensor, a geomagnetic sensor, or the like may also be used instead of or in addition to the acceleration sensor 37.

Second Embodiment

Next, a second embodiment of the present invention will be described.

In the first embodiment, the example of switching the thermal control based on the placement state of the information processing apparatus 10 is described. In this embodiment, an example of switching the thermal control according to a user's operation on the keyboard will be described. Since the basic structure/configuration of an information processing apparatus 10A according to the present embodiment is the same as the example of the information processing apparatus 10 illustrated in FIG. 1, FIG. 2, and FIG. 3, the description thereof will be omitted. In the present embodiment, functions and processing different from those in the first embodiment will be described.

First, examples of user's operations on the keyboard to perform thermal control will be described.

Figure 9:
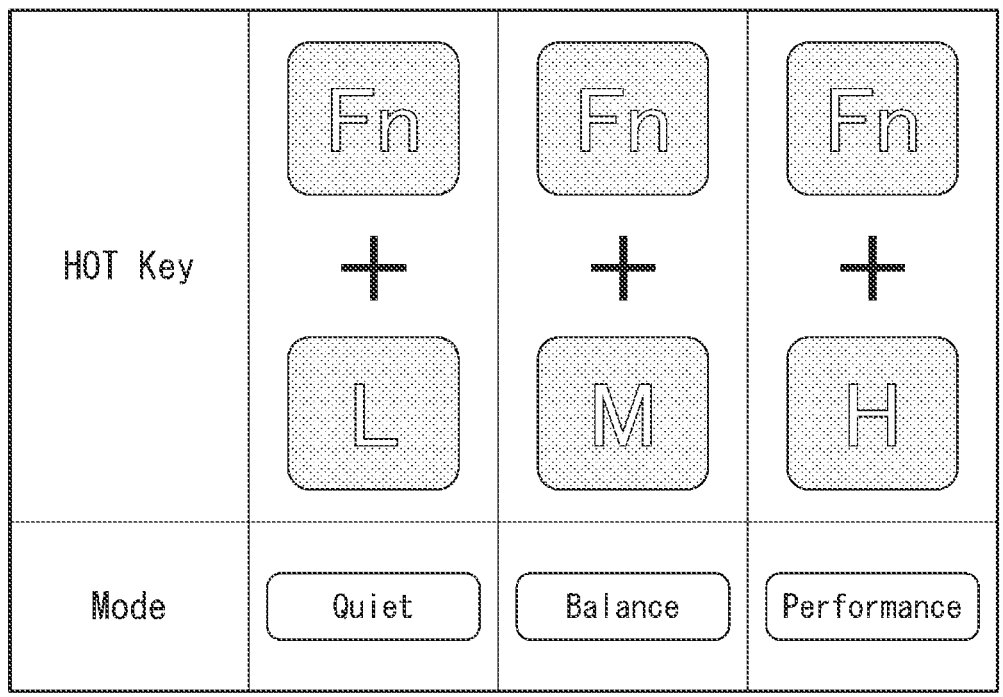
FIG. 9 is a diagram illustrating an example of correspondences between keyboard operations and thermal control according to a second embodiment.

FIG. 9 is a diagram illustrating an example of correspondences between keyboard operations and thermal control according to the present embodiment. In the illustrated example, a hot key that is a combination of "Fn" key and "L" key corresponds to a quiet mode (Quiet). A hot key that is a combination of "Fn" key and "M" key corresponds to a balance mode (Balance). A hot key that is a combination of "Fn" key and "H" key corresponds to a performance mode (Performance). The quiet mode, the balance mode, and the performance mode are operating modes related to the performance of the CPU 11.

The quiet mode is an operating mode to lower performance step before increasing the rotational speed of the cooling fan 35 when the temperature rises in order to give higher priority to quietness than the performance of the system processing by the CPU 11.

Here, suppressing the rotational speed of the cooling fan 35 means, by reducing the amount of heat generation of the CPU 11, any one or some of not rotating the cooling fan 35 being stopped, stopping the cooling fan 35 being rotated, rotating the cooling fan 35 being rotated at a high rotational speed by suppressing the rotational speed to such an extent that noise generated by the rotation of the cooling fan 35 is not an issue.

The performance mode is an operating mode to first increase the rotational speed of the cooling fan 35 up to a settable upper-limit speed when the temperature rises in order to give higher priority to performance than quietness. As mentioned above, when the detected temperature further rises even after the rotational speed of the cooling fan 35 is controlled, the performance step decreases.

The balance mode is an operating mode adjusted to take advantage of both of quietness in the quiet mode and performance in the performance mode, which performs control between the quiet mode and the performance mode.

When "Fn" key and "L" key of the input unit 32 (keyboard) are pressed at the same time with a user's operation, the information processing apparatus 10A is set to the quiet mode. When "Fn" key and "M" key of the input unit 32 (keyboard) are pressed at the same time with a user's operation, the information processing apparatus 10A is set to the balance mode. Further, when "Fn" key and "H" key of the input unit 32 (keyboard) are pressed at the same time with a user's operation, the information processing apparatus 10A is set to the performance mode.

Note that each of the hot keys that are the combinations of keys described above is just an example, and each hot key is not limited to the combination of keys.

Figure 10:
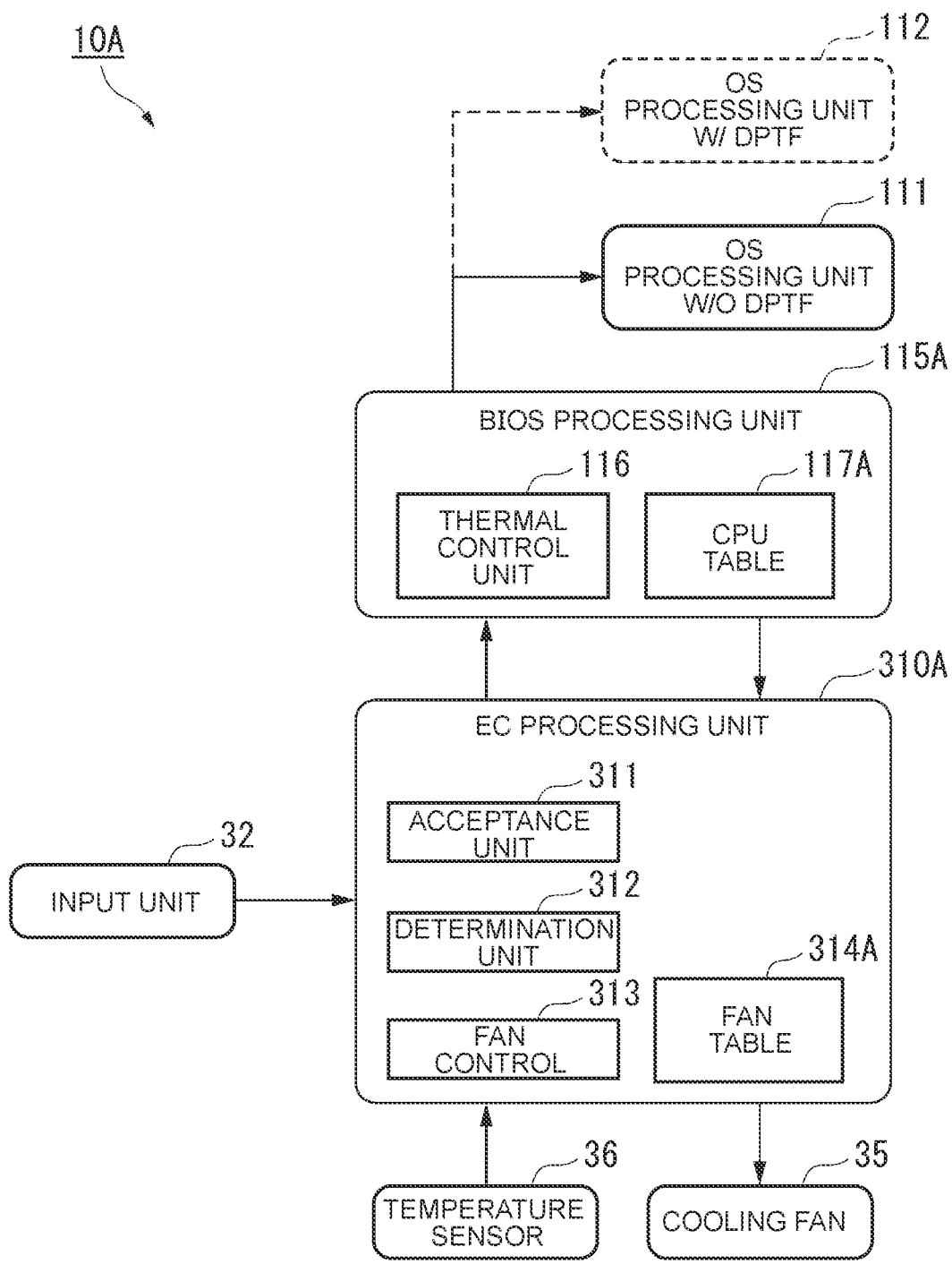
FIG. 10 is a block diagram illustrating an example of the functional configuration of an information processing apparatus according to the second embodiment.

FIG. 10 is a block diagram illustrating an example of the functional configuration of the information processing apparatus 10A according to the present embodiment. The information processing apparatus 10A includes, as a functional configuration related to thermal control, the OS processing unit 111 (the example of the system processing unit), a BIOS processing unit 115A, and an EC processing unit 310A. The functional configuration of the information processing apparatus 10A differs from that of the information processing apparatus 10 illustrated in FIG. 4 in that thermal control is switched based on an operation signal output from the input unit 32. For example, the operation signal is an operation signal generated with a hot key operation by the user as described above.

The EC processing unit 310A outputs notification information according to various kinds of input information, and controls the rotation of the cooling fan 35. The EC processing unit 310A includes the acceptance unit 311, the determination unit 312, the fan control unit 313, and a fan table 314A. The acceptance unit 311 accepts an operation signal output from the input unit 32 as input information. For example, the acceptance unit 311 accepts, as input information, an operation signal indicative of an operated key according to a user's operation on the input unit 32 (keyboard).

Based on the operation signal accepted by the acceptance unit 311, the determination unit 312 determines whether the operated key is a hot key that is a specific combination of keys or not. When the operated key is a hot key that is a specific combination of keys, the determination unit 312 outputs, to the BIOS processing unit 115A, determination result information based on the determination result as notification information. For example, when determining a hot key that is a combination of "Fn" key and "L" key, the determination unit 312 outputs, to the BIOS processing unit 115A, determination result information indicative of the quiet mode as notification information. When determining a hot key that is a combination of "Fn" key and "M" key, the determination unit 312 outputs, to the BIOS processing unit 115A, determination result information indicative of the balance mode as notification information. Further, when determining a hot key that is a combination of "Fn" key and "H" key, the determination unit 312 outputs, to the BIOS processing unit 115A, determination result information indicative of the performance mode as notification information.

The fan control unit 313 controls the rotation of the cooling fan 35. In the present embodiment, the fan control unit 313 refers to the fan table 314A to control the start of the rotation of the cooling fan 35, the stop of the rotation, the rotational speed, or the like.

Figure 11:
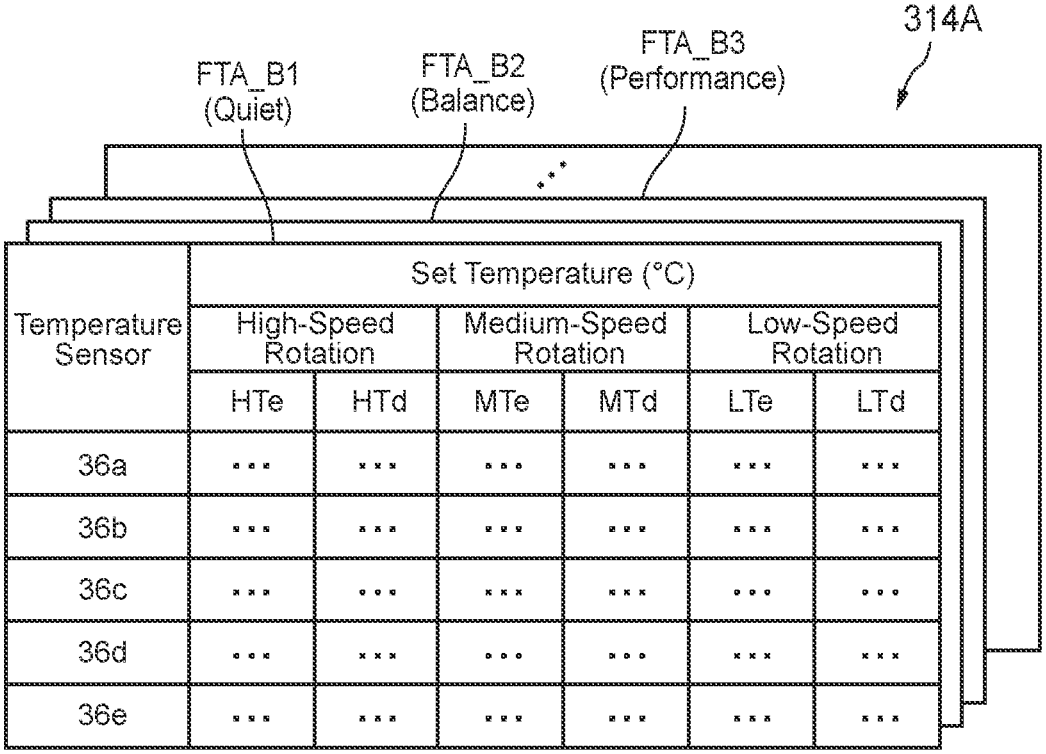
FIG. 11 is a diagram illustrating an example of a fan table according to the second embodiment.

FIG. 11 is a diagram illustrating an example of the fan table 314A according to the present embodiment. In the fan table 314A, the temperature sensors 36 are associated with set temperatures used to control the rotation of the cooling fan 35. Like in the fan table 314 illustrated in FIG. 5, the illustrated fan table 314A, data on set temperatures changed in the operating state of the cooling fan 35 among four-stage speed steps, i.e., stop of the operating state, low-speed rotation, medium-speed rotation, and high-speed rotation, are stored for each of the temperature sensors 36 (36a to 36e) placed in the predetermined plural positions inside the chassis BD of the information processing apparatus 10. In this fan table 314A illustrated in FIG. 11, tables are prepared in a selectable manner, such as table FTA_B1 (Quiet) applied in the quiet mode, table FTA_B2 (Balance) applied in the balance mode, and table FTA_B3 (Performance) applied in the performance mode.

For example, the cooling fan 35 needs to be controlled by suppressing the noise of the cooling fan 35 in the quiet mode more than the performance mode. Therefore, for example, the table FTA_B1 (Quiet) is so set that the timing to start the rotation of the cooling fan 35 becomes later and the upper limit of the rotational speed of the cooling fan 35 becomes lower than the table FTA_B3 (Performance). On the other hand, the table FTA_B3 (Performance) is set to increase the rotational speed according to the temperature rise at a stage earlier than the table FTA_B1 (Quiet). Further, the table FTA_B2 (Balance) is set between the table FTA_B1 (Quiet) and the table FTA_B3 (Performance). Which of the tables is referred to control the rotation of the cooling fan 35 is determined by an instruction from the BIOS processing unit 115A.

Returning to FIG. 10, the BIOS processing unit 115A includes the thermal control unit 116 and a CPU table 117A. The thermal control unit 116 executes control related to the performance of the system processing based on the determination result information (information indicative of any one of the quiet mode, the balance mode, and the performance mode) output from the EC processing unit 310A. For example, the thermal control unit 116 outputs, to the OS processing unit 111, system setting information (the example of the first setting information) for setting the operating mode of the CPU 11 preset according to the hot key that is a combination of keys as the control related to the performance of system processing.

Specifically, when the determination result information output from the EC processing unit 310A is information indicative of the quiet mode, the thermal control unit 116 refers to the CPU table 117A to output, to the OS processing unit 111, system setting information for setting the operating mode of the CPU 111 to the quiet mode. When the determination result information output from the EC processing unit 310A is information indicative of the balance mode, the thermal control unit 116 refers to the CPU table 117A to output, to the OS processing unit 111, system setting information for setting the operating mode of the CPU 111 to the balance mode. Further, when the determination result information output from the EC processing unit 310A is information indicative of the performance mode, the thermal control unit 116 refers to the CPU table 117A to output, to the OS processing unit 111, system setting information for setting the operating mode of the CPU 111 to the performance mode.

Figure 12:
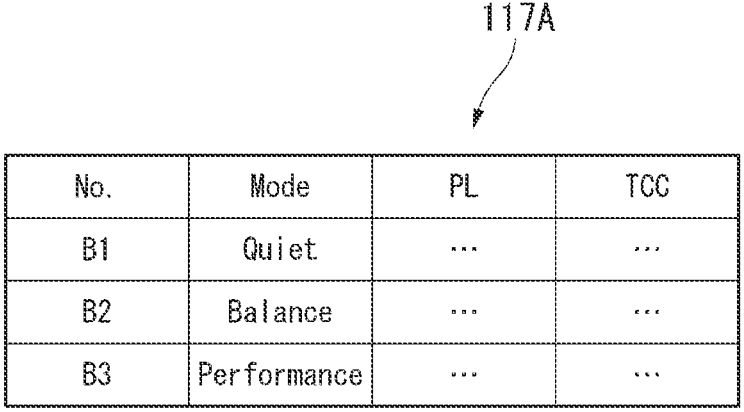
FIG. 12 is a diagram illustrating an example of a CPU table according to the second embodiment.

FIG. 12 is a diagram illustrating an example of the CPU table 117A according to the present embodiment. In the CPU table 117A, settings for each of the operating modes of the CPU 11 are stored. In the illustrated example, the quiet mode (Quiet), the balance mode (Balance), and the performance mode (Performance) are set as the operating modes of the CPU 11. In the quiet mode (Quiet), a mode No. "B1" of the quiet mode is associated with the settings of "PL" and "TCC" of the CPU 11 in the quiet mode. In the balance mode (Balance), a mode No. "B2" of the balance mode is associated with the settings of "PL" and "TCC" of the CPU 11 in the balance mode. In the performance mode (Performance), a mode No. "B3" of the performance mode is associated with the settings of "PL" and "TCC" of the CPU 11 in the performance mode.

For example, "PL" is so set that the upper-limit value of the power consumption of the CPU 11 is smaller in the quiet mode than in the performance mode. "PL" in the balance mode is set between those in the performance mode and the quiet mode. Further, "TCC" is so set that the upper-limit value of the operating frequency of the CPU 11 is smaller in the quiet mode than in the performance mode. "TCC" in the balance mode is set between those in the performance mode and the quiet mode. Note that any operating mode other than the quiet mode, the balance mode, and the performance mode may also be set in the CPU table 117A.

For example, upon setting the operating mode to the quiet mode, the thermal control unit 116 refers to the CPU table 117A to output, to the OS processing unit 111, information including the mode No. "B1" and set values of "PL" and "TCC" of the CPU 11 in the quiet mode as system setting information. Upon setting the operating mode to the balance mode, the thermal control unit 116 refers to the CPU table 117A to output, to the OS processing unit 111, information including the mode No. "B2" and set values of "PL" and "TCC" of the CPU 11 in the balance mode as system setting information. Further, upon setting the operating mode to the performance mode, the thermal control unit 116 refers to the CPU table 117A to output, to the OS processing unit 111, information including the mode No. "B3" and set values of "PL" and "TCC" of the CPU 11 in the performance mode as system setting information.

Further, the thermal control unit 116 outputs, to the EC processing unit 310A, fan setting information (the example of the second setting information) for setting the fan table 314A referred to by the EC processing unit 310A to control the rotation of the cooling fan 35 according to whether the operating mode is the quiet mode, the balance mode, or the performance mode as the control related to the performance of the system processing.

Specifically, when the determination result information output from the EC processing unit 310A is information indicative of the quiet mode, the thermal control unit 116 outputs, to the EC processing unit 310A, fan setting information to be set to the table FTA_B1 (Quiet) of the quiet mode in the fan table 314A illustrated in FIG. 11. The fan control unit 313 of the EC processing unit 310A refers to the table FTA_B1 (Quiet) to control the rotation of the cooling fan 35 based on this fan setting information.

When the determination result information output from the EC processing unit 310A is information indicative of the balance mode, the thermal control unit 116 outputs, to the EC processing unit 310A, fan setting information to be set to the table FTA_B2 (Balance) of the balance mode in the fan table 314A illustrated in FIG. 11. The fan control unit 313 of the EC processing unit 310A refers to the table FTA_B2 (Balance) to control the rotation of the cooling fan 35 based on this fan setting information.

Further, when the determination result information output from the EC processing unit 310A is information indicative of the performance mode, the thermal control unit 116 outputs, to the EC processing unit 310A, fan setting information to be set to the table FTA_B3 (Performance) of the performance mode in the fan table 314A illustrated in FIG. 11. The fan control unit 313 of the EC processing unit 310A refers to the table FTA_B3 (Performance) to control the rotation of the cooling fan 35 based on this fan setting information.

The OS processing unit 111 executes processing by such an OS as not to be equipped with the DPTF driver running on Windows (registered trademark), i.e., processing by any other OS such as Linux (registered trademark). In the present embodiment, the DPTF driver is just an example that supports the quiet mode, the balance mode, the performance mode, and the like, and the same applies to any other driver (for example, DTT) as long as the driver supports these modes. In the following, description will be made by taking the DPTF driver as an example. The OS processing unit 111 controls the operation of the CPU 11 based on the system setting information output from the BIOS processing unit 115A. For example, when acquiring the system setting information to be set to the quiet mode from the BIOS processing unit 115A, the OS processing unit 111 controls the operation of the CPU 11 based on the set values of "PL" and "TCC" of the CPU 11 in the quiet mode included in the system setting information. When acquiring system setting information to be set to the balance mode from the BIOS processing unit 115A, the OS processing unit 111 controls the operation of the CPU 11 based on the set values of "PL" and "TCC" of the CPU 11 in the balance mode included in the system setting information. Further, when acquiring system setting information to be set to the performance mode from the BIOS processing unit 115A, the OS processing unit 111 controls the operation of the CPU 11 based on the set values of "PL" and "TCC" of the CPU 11 in the performance mode included in the system setting information.

Note that the thermal control of the present embodiment can also be applied to a case of using Windows (registered trademark) equipped with the DPTF driver as the OS. The OS processing unit 112 (the other example of the system processing unit) illustrated in FIG. 10 indicates an example of a functional component to execute processing by Windows (registered trademark) equipped with the DPTF driver. The information processing apparatus 10A may include this OS processing unit 112 instead of or in addition to the OS processing unit 111. Like the OS processing unit 111, the OS processing unit 112 controls the operation of the CPU 11 based on the system setting information output from the BIOS processing unit 115A. However, as for the settings of the CPU 11 (PL, TCC, and the like) used to control the operation of the CPU 11, the OS processing unit 112 uses those set by the DPTF driver. For example, the OS processing unit 112 controls the operation of the CPU 11 based on the system setting information output from the BIOS processing unit 115A. In the DPTF driver, for example, a thermal control data table including at least the settings (PL, TCC, and the like) of the CPU 11 for the quiet mode, the balance mode, and the performance mode, respectively, is stored. When acquiring system setting information to be set to the quiet mode from the BIOS processing unit 115A, the OS processing unit 112 uses the DPTF driver to refer to the thermal control data table corresponding to the mode No. "B1" indicative of the quiet mode included in the system setting information in order to control the operation of the CPU 11. When acquiring system setting information to be set to the balance mode from the BIOS processing unit 115A, the OS processing unit 112 uses the DPTF driver to refer to the thermal control data table corresponding to the mode No. "B2" indicative of the balance mode included in the system setting information in order to control the operation of the CPU 11. Further, when acquiring system setting information to be set to the performance mode from the BIOS processing unit 115A, the OS processing unit 112 uses the DPTF driver to refer to the thermal control data table corresponding to the mode No. "B3" indicative of the performance mode included in the system setting information in order to control the operation of the CPU 11.

Figure 13:
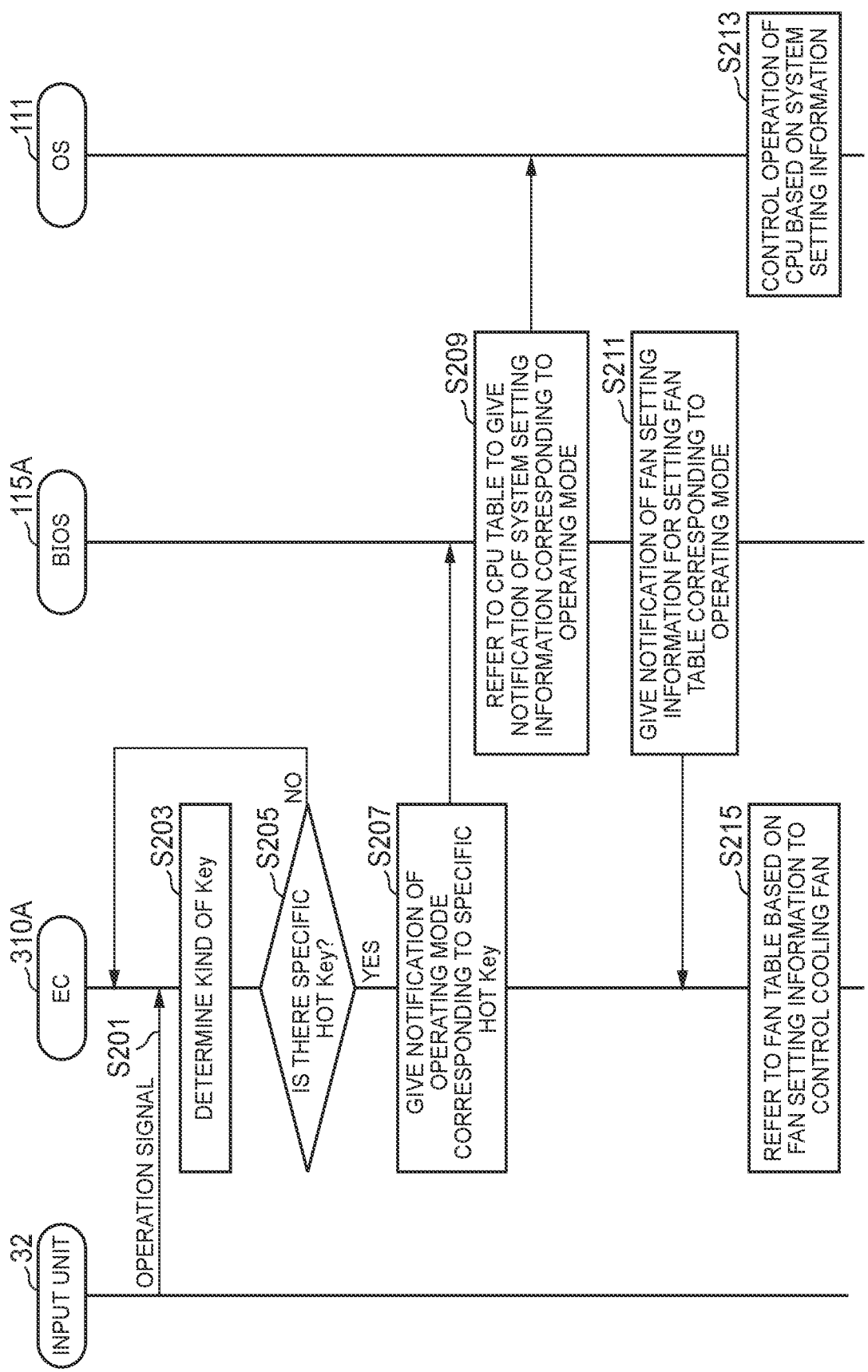
FIG. 13 is a flowchart illustrating an example of thermal control processing according to the second embodiment.

Referring next to FIG. 13, the operation of thermal control processing executed by respective components of the information processing apparatus 10A will be described. FIG. 13 is a flowchart illustrating an example of thermal control processing according to the present embodiment.

(Step S201) When acquiring an operation signal output from the input unit 32 (keyboard), the EC processing unit 310A proceeds to processing in step S203.

(Step S203) Based on the operation signal acquired in step S201 from the input unit 32, the EC processing unit 310A determines the kind of key operated through the input unit 32 (keyboard). Then, the EC processing unit 310A proceeds to processing in step S205.

(Step S205) Based on the determination result on the kind of key in step S203, the EC processing unit 310A determines whether the operated key is a specific hot key or not. The specific hot key indicates a hot key corresponding to each of the quiet mode, the balance mode, and the performance mode, respectively. When determining that the operated key is not the specific hot key (NO), the EC processing unit 310A returns to the processing in step S201 to acquire an operation signal output from the input unit 32 (keyboard). On the other hand, when determining that the operated key is the specific hot key (YES), the EC processing unit 310A proceeds to processing in step S207.

(Step S207) The EC processing unit 310A notifies the BIOS processing unit 115A of determination result information indicative of the operating mode (quiet mode/balance mode/performance mode) corresponding to the specific hot key. For example, when the operated key is the hot key as the combination of "Fn" key and "L" key, the EC processing unit 310A outputs, to the BIOS processing unit 115A, determination result information indicative of the quiet mode. When the operated key is the hot key as the combination of "Fn" key and "M" key, the EC processing unit 310A outputs, to the BIOS processing unit 115A, determination result information indicative of the balance mode. Further, when the operated key is the hot key as the combination of "Fn" key and "H" key, the EC processing unit 310A outputs, to the BIOS processing unit 115A, determination result information indicative of the performance mode. Then, the procedure proceeds to processing in step S209.

(Step S209) When acquiring the determination result information output from the EC processing unit 310A in step S207, the BIOS processing unit 115A refers to the CPU table 117A illustrated in FIG. 12 based on this determination result information to notify the OS processing unit 111 of system setting information to be set to the quiet mode, the balance mode, or the performance mode. For example, when the determination result information output from the EC processing unit 310A is information indicative of the quiet mode, the BIOS processing unit 115A refers to the CPU table 117A to output, to the OS processing unit 111, system setting information for setting the operating mode of the CPU 111 to the quiet mode. When the determination result information output from the EC processing unit 310A is information indicative of the balance mode, the BIOS processing unit 115A refers to the CPU table 117A to output, to the OS processing unit 111, system setting information for setting the operating mode of the CPU 111 to the balance mode. Further, when the determination result information output from the EC processing unit 310A is information indicative of the performance mode, the BIOS processing unit 115A refers to the CPU table 117A to output, to the OS processing unit 111, system setting information for setting the operating mode of the CPU 111 to the performance mode. Then, the BIOS processing unit 115A proceeds to processing in step S211.

(Step S211) When acquiring the determination result information output from the EC processing unit 310A in step S207, the BIOS processing unit 115A notifies the EC processing unit 310A of fan setting information for setting the fan table 314A, referred to by the EC processing unit 310A to control the rotation of the cooling fan 35, to a table corresponding to the operating mode based on the determination result information. For example, when the determination result information output from the EC processing unit 310A is information indicative of the quiet mode, the BIOS processing unit 115A outputs, to the EC processing unit 310A, fan setting information to be set to the table FTA_B1 (Quiet) of the quiet mode in the fan table 314A illustrated in FIG. 11. When the determination result information output from the EC processing unit 310A is information indicative of the balance mode, the BIOS processing unit 115A outputs, to the EC processing unit 310A, fan setting information to be set to the table FTA_B2 (Balance) of the balance mode in the fan table 314A illustrated in FIG. 11. Further, when the determination result information output from the EC processing unit 310A is information indicative of the performance mode, the BIOS processing unit 115A outputs, to the EC processing unit 310A, fan setting information to be set to the table FTA_B3 (Performance) of the performance mode in the fan table 314A illustrated in FIG. 11.

Note that the order of processing in step S209 and step S211 may be changed or the processing in step S209 and step S211 may be performed at the same time.

(Step S213) When acquiring system setting information output from the BIOS processing unit 115A in step S209, the OS processing unit 111 controls the operation of the CPU 11 based on this system setting information. For example, when acquiring system setting information to be set to the quiet mode from the BIOS processing unit 115A, the OS processing unit 111 controls the operation of the CPU 11 based on the set values of "PL" and "TCC" of the CPU 11 in the quiet mode included in the system setting information. When acquiring system setting information to be set to the balance mode from the BIOS processing unit 115A, the OS processing unit 111 controls the operation of the CPU 11 based on the set values of "PL" and "TCC" of the CPU 11 in the balance mode included in the system setting information. Further, when acquiring system setting information to be set to the performance mode from the BIOS processing unit 115A, the OS processing unit 111 controls the operation of the CPU 11 based on the set values of "PL" and "TCC" of the CPU 11 in the performance mode included in the system setting information.

Note that when the OS of the information processing apparatus 10A is Windows (registered trademark) equipped with the DPTF driver, the OS processing unit 112 controls the operation of the CPU 11 in step S213 based on the system setting information output from the BIOS processing unit 115A. For example, when acquiring system setting information to be set to the quiet mode from the BIOS processing unit 115A, the OS processing unit 112 controls the operation of the CPU 11 based on the settings (PL, TCC, and the like) of the CPU 11 for the quiet mode set by the DPTF driver. When acquiring system setting information to be set to the balance mode from the BIOS processing unit 115A, the OS processing unit 112 controls the operation of the CPU 11 based on the settings (PL, TCC, and the like) of the CPU 11 for the balance mode set by the DPTF driver. Further, when acquiring system setting information to be set to the performance mode from the BIOS processing unit 115A, the OS processing unit 112 controls the operation of the CPU 11 based on the settings (PL, TCC, and the like) of the CPU 11 for the performance mode set by the DPTF driver.

(Step S215) When acquiring fan setting information output from the BIOS processing unit 115A in step S211, the EC processing unit 310 refers to a table based on the fan setting information in the fan table 314A to control the cooling fan 35. For example, when acquiring fan setting information to be set to the table FTA_B1 (Quiet) of the quiet mode, the EC processing unit 310A refers to the table FTA_B1 (Quiet) to control the rotation of the cooling fan 35. When acquiring fan setting information to be set to the table FTA_B2 (Balance) of the balance mode, the EC processing unit 310A refers to the table FTA_B2 (Balance) to control the rotation of the cooling fan 35. Further, when acquiring fan setting information to be set to the table FTA_B3 (Performance) of the performance mode, the EC processing unit 310A refers to the table FTA_B3 (Performance) to control the rotation of the cooling fan 35.

As described above, in the information processing apparatus 10A according to the present embodiment, the embedded controller 31 (EC processing unit 310A) accepts an operation signal indicative of a key corresponding to a user's operation to the input unit 32 (keyboard) according to the operation as input information, and determines, based on the accepted operation signal, whether the operated key is a specific hot key (a specific combination of keys) or not. When determining that the key is the specific hot key, the EC processing unit 310A outputs, to the CPU 11 (BIOS processing unit 115A), determination result information (information indicative of quiet mode/balance mode/performance mode) based on the determination result as notification information. The BIOS processing unit 115A executes control related to the performance of the system processing based on the determination result information output from the EC processing unit 310A.

In the information processing apparatus 10A, the embedded controller 31 determines, depending on the key operated on the keyboard, which of the quiet mode, the balance mode, and performance mode the operation is to select, and the BIOS performs control related to performance based on the determination result to enable highly versatile thermal control independent of the type of OS. Thus, the information processing apparatus 10A can select the operating mode (quiet mode/balance mode/performance mode) with a user's hot-key operation independently of the type of OS.

For example, the BIOS processing unit 115A outputs, to the OS processing unit 111 or the OS processing unit 112, system setting information (the example of the first setting information) for setting the operating mode of the CPU 11 (quiet mode/balance mode/performance mode) preset according to the specific hot key as control related to the performance of the system processing. Based on the system setting information (quiet mode/balance mode/performance mode) output from the BIOS processing unit 115A, the OS processing unit 111 or the OS processing unit 112 controls the upper limit of the power consumption or the upper limit of the operating frequency of the CPU 11, and the like.

Thus, since the information processing apparatus 10A can control the upper limit of the power consumption or the upper limit of the operating frequency of the CPU 11, and the like corresponding to the quiet mode, the balance mode, or the performance mode according to a user's operation without depending on the type of OS, user convenience is improved.

Further, the BIOS processing unit 115A outputs, to the EC processing unit 310A, fan setting information (the example of the second setting information) for setting the operating mode (quiet mode/balance mode/performance mode) related to fan rotation control of the heat dissipation unit preset according to the specific hot key as control related to the performance of the system processing. Based on the fan setting information (quiet mode/balance mode/performance mode) output from the BIOS processing unit 115A, the EC processing unit 310A controls the rotation of the cooling fan 35.

Thus, since the information processing apparatus 10A can control the rotation of the cooling fan 35 corresponding to the quiet mode, the balance mode, or the performance mode according to the user's operation without depending on the type of OS, user convenience is improved.

While the embodiments of this invention have been described in detail above with reference to the accompanying drawings, the specific configurations are not limited to those described above, and various design changes and the like can be made without departing from the scope of this invention. For example, respective components descried in the aforementioned embodiments may be combined arbitrarily.

In the aforementioned embodiments, the example in which both the control of the CPU 11 and the control of the cooling fan 35 are performed as thermal control is described, either one of the control of the CPU 11 and the control of the cooling fan 35 may be performed. For example, the aforementioned embodiments can also be applied to a case of suppressing a rise in chassis temperature of an information processing apparatus without having the cooling fan 35.

Further, the above-described information processing apparatus 10 (10A) has a computer system therein. Then, a program for implementing the function of each of components included in the above-described information processing apparatus 10 (10A) may be recorded on a computer-readable recording medium in such a manner that the program recorded on this recording medium is read into the computer system and executed to perform processing in each component included in the above-described information processing apparatus 10 (10A). Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the information processing apparatus 10 (10A), or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the above-described information processing apparatus 10 (10A) in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, in the above-described embodiments, the example in which the information processing apparatus 10 (10A) is a laptop PC is described, but the information processing apparatus 10 (10A) may also be a tablet PC or a desktop PC. Further, the information processing apparatus 10 (10A) may be a smartphone, a game console, or the like.

DESCRIPTION OF SYMBOLS 10, 10A: information processing apparatus, 101: first chassis, 102: second chassis, 103: hinge mechanism, 11: CPU, 21: chipset, 31: embedded controller, 32: input unit, 35: cooling fan, 36: temperature sensor, 37: acceleration sensor, 111: OS processing unit, 115, 115A: BIOS processing unit, 116: thermal control unit, 117, 117A: CPU table, 310, 310A: EC processing unit, 311: acceptance unit, 312: determination unit, 313: fan control unit, 314, 314A: fan table.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a processor; and
a controller that outputs, to the processor, notification information according to input information, wherein
the processor:
executes system processing based on an operating system (OS), and
executes operation of thermal control processing by control of a Basic Input Output System (BIOS) using the notification information output from the controller, wherein the controller:
- accepts, as the input information, an operation signal indicative of an operated key according to a user's operation on a keyboard,
- determines whether the operated key is of a specific combination of keys based on the accepted operation signal, and
- upon making a determination that the operated key is of the specific combination of keys, outputs, to the processor, a result of the determination as the notification information, and without another key being pressed after the result of the determination is output from the controller, the processor executes the thermal control processing based on the result of the determination.

2. The information processing apparatus according to claim 1, wherein the controller further:
- accepts, as the input information, a detection signal output from a sensor according to movement of the information processing apparatus,
- determines a placement state of the information processing apparatus based on the accepted detection signal, and
- upon making a determination of the placement state, outputs, to processor, a result of the determination as the notification information, and
- the processor further executes the thermal control processing based on the result of the determination output from the controller.

3. The information processing apparatus according to claim 2, wherein the processor further executes the thermal control processing based on first setting information for setting an operating mode of the processor that is preset according to the placement state of the information processing apparatus.

4. The information processing apparatus according to claim 3, further comprising:
- a fan that replaces air inside a chassis of the information processing apparatus with outside air by rotation of the fan, wherein
- the processor further executes the thermal control processing by outputting, to the controller, second setting information for setting an operating mode related to control of the rotation of the fan that is preset according to the placement state of the information processing apparatus, and
- the controller controls the rotation of the fan based on the second setting information output from the processor.

5. The information processing apparatus according to claim 1, wherein the processor further executes the operation of thermal control processing based on first setting information for setting an operating mode of the processor that is preset according to the specific combination of keys.

6. The information processing apparatus according to claim 5, further comprising:
- a fan that replaces air inside a chassis of the information processing apparatus with outside air by rotation of the fan, wherein
- the processor further executes the operation of thermal control processing by outputting, to the controller, second setting information for setting an operating mode related to control of the rotation of the fan, and
- the controller controls the rotation of the fan based on the second setting information output from the processor.

7. The information processing apparatus according to claim 3, wherein the first setting information includes information related to an upper limit of power consumption of the processor.

8. The information processing apparatus according to claim 3, wherein the first setting information includes information related to an upper limit of an operating frequency of the processor.

9. A control method for an information processing apparatus, comprising:
- executing, by a processor, system processing based on an operating system (OS);
- outputting, by a controller, notification information according to input information;
- executing, by the processor, control related to operation of thermal control processing by control of a Basic Input Output System (BIOS) using the notification information output from the controller;
- accepting, as the input information by the controller, an operation signal indicative of an operated key according to a user's operation on a keyboard,
- determining, by the controller, whether the operated key is of a specific combination of keys based on the accepted operation signal, and
- upon making a determination that the operated key is of the specific combination of keys, without another key being pressed after a result of the determination is output from the controller, executing, by the processor, the operation of thermal control processing based on the result of the determination as the notification information.

* * * * *